United States Patent
Kida et al.

(10) Patent No.: US 10,692,448 B2
(45) Date of Patent: Jun. 23, 2020

(54) DISPLAY UNIT WITH TOUCH DETECTION FUNCTION AND ELECTRONIC UNIT

(71) Applicant: Japan Display Inc., Tokyo (JP)

(72) Inventors: Yoshitoshi Kida, Kanagawa (JP); Kohei Azumi, Tokyo (JP); Koji Noguchi, Tokyo (JP); Koji Ishizaki, Tokyo (JP)

(73) Assignee: Japan Display Inc., Tokyo (JP)

( * ) Notice: Subject to any disclaimer, the term of this patent is extended or adjusted under 35 U.S.C. 154(b) by 153 days.

(21) Appl. No.: 14/739,707

(22) Filed: Jun. 15, 2015

(65) Prior Publication Data

US 2015/0294629 A1    Oct. 15, 2015

Related U.S. Application Data

(63) Continuation of application No. 13/137,565, filed on Aug. 26, 2011, now abandoned.

(30) Foreign Application Priority Data

Sep. 29, 2010  (JP) .................................. 2010-218732

(51) Int. Cl.
*G06F 3/044* (2006.01)
*G09G 3/36* (2006.01)
(Continued)

(52) U.S. Cl.
CPC ........... *G09G 3/3611* (2013.01); *G06F 3/044* (2013.01); *G06F 3/0416* (2013.01);
(Continued)

(58) Field of Classification Search
CPC ...... G06F 3/0412; G06F 3/044; G06F 3/0416; G09G 3/3611; G09G 3/3648;
(Continued)

(56) References Cited

U.S. PATENT DOCUMENTS

| 6,239,788 B1 | 5/2001 | Nohno et al. |
| 7,205,965 B2 * | 4/2007 | Mikami ............... G09G 3/3233 345/76 |

(Continued)

FOREIGN PATENT DOCUMENTS

| CN | 102436086 B | 1/2016 |
| JP | 2007-139817 A | 6/2007 |

(Continued)

OTHER PUBLICATIONS

Japanese Office Action dated Aug. 27, 2013 for corresponding Japanese Application No. 2010-218732.

(Continued)

*Primary Examiner* — Jeff Piziali
(74) *Attorney, Agent, or Firm* — Michael Best & Friedrich LLP

(57) ABSTRACT

A display unit with touch detection function includes a plurality of pixel signal lines each transmitting a pixel signal for display; a pixel signal line drive section applying the pixel signal to each of the pixel signal lines; display elements each performing display based on the pixel signal; touch detection electrodes each outputting a detection signal based on a change in capacitance occurring due to an external proximity object; and a touch detection section detecting, in a touch detection period, a touch event based on the detection signal, the touch detection period being different from a display period for the display elements to perform display operation. The pixel signal line drive section maintains a voltage of each of the pixel signal lines at a certain level during the touch detection period.

4 Claims, 25 Drawing Sheets

(51) Int. Cl.
*G06F 3/041* (2006.01)
*G02F 1/1333* (2006.01)

(52) U.S. Cl.
CPC ......... *G09G 3/3648* (2013.01); *G09G 3/3674* (2013.01); *G09G 3/3685* (2013.01); *G02F 1/13338* (2013.01); *G09G 2310/0278* (2013.01); *G09G 2310/065* (2013.01); *G09G 2320/0219* (2013.01)

(58) Field of Classification Search
CPC ............... G09G 3/3674; G09G 3/3685; G09G 2310/0278; G09G 2310/065; G09G 2320/01219; G02F 1/13338
See application file for complete search history.

(56) References Cited

U.S. PATENT DOCUMENTS

| | | | |
|---|---|---|---|
| 7,379,054 B2 | 5/2008 | Lee | |
| 7,876,311 B2 | 1/2011 | Krah et al. | |
| 8,477,105 B2 * | 7/2013 | Haga | G06F 3/0412 178/18.01 |
| 8,537,125 B2 * | 9/2013 | Mamba | G06F 3/044 178/18.06 |
| 8,537,126 B2 * | 9/2013 | Yousefpor | G06F 3/0416 345/173 |
| 8,552,989 B2 * | 10/2013 | Hotelling | G02F 1/13338 345/104 |
| 8,766,924 B2 * | 7/2014 | Yamauchi | H03K 17/9622 178/18.03 |
| 8,866,751 B2 * | 10/2014 | Park | G06F 3/0412 345/156 |
| 2004/0125066 A1 * | 7/2004 | Park | G09G 3/3648 345/92 |
| 2005/0052582 A1 * | 3/2005 | Mai | G02F 1/13338 349/12 |
| 2008/0291195 A1 * | 11/2008 | Lee | G02F 1/1362 345/214 |
| 2008/0309628 A1 | 12/2008 | Krah et al. | |
| 2009/0009483 A1 | 1/2009 | Hotelling et al. | |
| 2009/0040192 A1 | 2/2009 | Haga | |
| 2009/0315857 A1 | 12/2009 | Nishitani et al. | |
| 2010/0013791 A1 * | 1/2010 | Haga | G06F 3/0412 345/174 |
| 2010/0058376 A1 | 3/2010 | Alhadeff et al. | |
| 2010/0060589 A1 | 3/2010 | Wilson | |
| 2010/0085322 A1 | 4/2010 | Mamba et al. | |
| 2010/0110040 A1 | 5/2010 | Kim et al. | |
| 2010/0182273 A1 | 7/2010 | Noguchi et al. | |
| 2010/0325544 A1 | 12/2010 | Alhadeff et al. | |
| 2010/0325646 A1 | 12/2010 | Alhadeff et al. | |
| 2010/0333129 A1 | 12/2010 | Alhadeff et al. | |
| 2011/0029365 A1 | 2/2011 | Alhadeff et al. | |
| 2011/0307306 A1 | 12/2011 | Alhadeff et al. | |
| 2012/0075240 A1 | 3/2012 | Kida et al. | |
| 2013/0050146 A1 | 2/2013 | Saitoh et al. | |
| 2013/0080242 A1 | 3/2013 | Alhadeff et al. | |

FOREIGN PATENT DOCUMENTS

| | | |
|---|---|---|
| JP | 2008-165434 A | 7/2008 |
| JP | 2009-042899 A | 2/2009 |
| JP | 2009-244958 | 10/2009 |
| JP | 2010-003060 A | 1/2010 |
| KR | 1020060132122 A | 12/2006 |
| WO | 2009/119664 A1 | 10/2009 |
| WO | WO-2011/145360 A1 | 11/2011 |

OTHER PUBLICATIONS

Dictionary.com, "proximity," in Dictionary.com Unabridged. Source location: Random House, Inc. http://dictionary.reference.com/browse/proximity, Mar. 6, 2014, p. 1.
Korean Office Action dated Mar. 29, 2018, for corresponding Korean Patent Application No. 10-2011-0088901.
Chinese Office Action dated Dec. 5, 2017, for corresponding Chinese Patent Application No. 201510881325.X.
U.S. Office Action dated Apr. 29, 2019, for corresponding U.S. Appl. No. 13/137,565.

* cited by examiner

FIG. 20A

| + | − | + | − | + | − |
|---|---|---|---|---|---|
| − | + | − | + | − | + |
| + | − | + | − | + | − |
| − | + | − | + | − | + |

FIG. 20B

| − | + | − | + | − | + |
|---|---|---|---|---|---|
| + | − | + | − | + | − |
| − | + | − | + | − | + |
| + | − | + | − | + | − | ns
DISPLAY UNIT WITH TOUCH DETECTION FUNCTION AND ELECTRONIC UNIT

CROSS REFERENCES TO RELATED APPLICATIONS

This is a Continuation of application Ser. No. 13/137,565, filed on Aug. 26, 2011, which claims priority to Japanese Patent Application Number 2010-218732, filed in the Japanese Patent Office on Sep. 29, 2010, the entire contents of which are incorporated herein by reference.

BACKGROUND

The present disclosure relates to a display unit having touch detection function, and particularly relates to a display unit with touch detection function of detecting a touch event based on a change in capacitance due to an external proximity object, and an electronic unit having such the display unit with a touch detection function.

Recently, a display unit has been notified, where a touch detection device, a so-called touch panel, is mounted on a display device such as liquid crystal display device, or the touch panel is integrated with the display device, and various button images or the like are displayed on the display device instead of common mechanical buttons, enabling information input. Such a display unit having the touch panel needs no input device such as a keyboard, a mouse, and a keypad and therefore tends to be expansively used not only for computers but also for handheld information terminals such as a mobile phone.

A type of the touch detection device includes several types such as an optical type and a resistance type. In particular, a capacitance-type touch detection device has been promising as a device allowing low power consumption with a relatively simple structure. For example, Japanese Unexamined Patent Application Publication No. 2009-244958 (JP-A-2009-244958) proposes a display unit where an common-electrode originally provided for display of the display unit is used also as one of a pair of electrodes for a touch sensor, and the other electrode (touch detection electrode) is disposed to intersect the common electrode. Capacitance is formed between the common electrode and the touch detection electrode, and the capacitance is changed in response to an external proximity object. The display unit uses such change in capacitance to detect the external proximity object by analyzing a touch detection signal shown on the touch detection electrode when a drive signal is applied to the common electrode.

SUMMARY

A touch detection device may be affected by display operation of a display device. Specifically, for example, a signal traveling within the display device may be transmitted to a touch detection signal within the touch detection device through parasitic capacitance. This may cause degradation in S/N ratio of the touch detection signal, leading to degradation in accuracy of touch position or the like. There is no description in JP-A-2009-244958 of influence of display operation on touch detection.

It is desirable to provide a display unit with touch detection function and an electronic unit, where touch detection may be performed while suppressing influence of display operation.

A display unit with a touch detection function according to an embodiment of the disclosure includes a plurality of pixel signal lines, a pixel signal line drive section, display elements, touch detection electrodes, and a touch detection section. The plurality of pixel signal lines each transmits a pixel signal for display. The pixel signal line drive section applies the pixel signal to each of the pixel signal lines. The display elements each perform display based on the pixel signal. The touch detection electrodes each output a detection signal based on a change in capacitance occurring due to an external proximity object. The touch detection section detects, in a touch detection period, a touch event based on the detection signal, the touch detection period being different from a display period for the display elements to perform display operation. The pixel signal line drive section maintains a voltage of each of the pixel signal lines at a certain level during the touch detection period.

An electronic unit according to an embodiment of the disclosure has the display section with touch detection function described above, and includes, for example, a television device, a digital camera, a personal computer, a video camera, a mobile terminal device such as a mobile phone.

In the display unit with touch detection function and the electronic unit according to the embodiments of the disclosure, the pixel signals are applied to the pixel signal lines for performing display during the display period, and touch detection is performed based on the detection signal from the touch detection electrode during the touch detection period. At this time in the touch detection period, operation is performed in such a manner that a voltage of each of the pixel signal lines is maintained at a certain level in the touch detection period.

In the display unit with touch detection function according to the embodiment of the disclosure, for example, during the touch detection period, the pixel signal line drive section desirably applies the voltage of the certain level to each of the pixel signal lines or desirably allows the pixel signal lines to be in a floating state.

For example, the plurality of pixel signal lines may be arranged side by side, and the pixel signal line drive section may apply, in the display period, the pixel signals with the same polarities to the pixel signal lines adjacent to each other, and may reverse, at every display period, the polarity of each of the pixel signals to be applied. In this case, a voltage of the touch detection electrode is desirably settled to a predetermined voltage immediately before the touch detection period.

For example, the touch detection section desirably has a detection switch allowing the detection signal to be transmitted. For example, the detection switch is desirably stays on in the touch detection period and in a predetermined period, within the display period, immediately before the touch detection period, and stays off in the display period excluding the predetermined period. Alternatively, for example, the display period and the touch detection period may be alternately provided, and the pixel signal line drive section may set the voltage of each of the pixel signal lines to a predetermined level in the touch detection period. In this case, for example, the detection switch may stay on in the touch detection period, and stays off in the display period. For example, the touch detection section may include an integration circuit integrating the detection signal supplied via the detection switch in the touch detection period.

For example, the plurality of pixel signal lines may be arranged side by side, and the pixel signal line drive section may apply, in the display period, the pixel signals with different polarities to the pixel signal lines adjacent to each other, and may reverse, at every display period, the polarity of each of the pixel signals to be applied. In this case, for example, the pixel signal line drive section desirably applies, in the display period, a mid-level voltage to the pixel signal lines and then applies the respective pixel signals to the pixel signal lines, the mid-level voltage being a voltage at a center between the pixel signals with different polarities. For example, the touch detection section may include a detection switch allowing the detection signal to be transmitted and an integration circuit integrating the detection signal supplied via the detection switch in the touch detection period.

In the display unit with touch detection function and the electronic unit according to the embodiments of the disclosure, since the voltage of the pixel signal line is maintained at a certain level in the touch detection period, touch detection may be performed while suppressing influence of display operation.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

FIGS. 20A and 20B are schematic diagrams illustrating an operation example of a display unit with a touch detection function according to the third embodiment.

FIG. 29 is a section diagram illustrating a schematic section structure of a display device with a touch detection function according to a modification of each of the embodiments and the like.

DETAILED DESCRIPTION

Hereinafter, embodiments of the disclosure will be described in detail with reference to drawings. It is to be noted that description is made in the following order.

1. Basic Principle of Capacitance-Type Touch Detection
2. First Embodiment
3. Second Embodiment
4. Third Embodiment
5. Application Examples

1. Basic Principle of Capacitance-Type Touch Detection

First, a basic principle of touch detection of a display unit with a touch detection function according to embodiments of the disclosure is described with reference to FIGS. 1 to 3. This touch detection method is embodied as a capacitance-type touch sensor. In the capacitance-type touch sensor, for example, a pair of electrodes (drive electrode E1 and touch detection electrode E2) disposed opposite each other with a dielectric body D in between are used to configure a capacitance element, as illustrated in (A) of FIG. 1. Such a structure is expressed as an equivalent circuit illustrated in (B) of FIG. 1. The drive electrode E1, the touch detection electrode E2, and the dielectric body D configure a capacitance element C1. One end of the capacitance element C1 is connected to an AC signal source (drive signal source) S, and the other end P is grounded via a resistor R and connected to a voltage detector, or a touch detection circuit, DET. When an AC rectangular wave Sg ((B) of FIG. 3), having a predetermined frequency, for example, approximately several kilohertz to several tens kilohertz, is applied from the AC signal source S to the drive electrode E1, or one end of the capacitance element C1, an output waveform, or touch detection signal Vdet, as illustrated in (A) of FIG. 3 is shown at the touch detection electrode E2 (the other end P of the capacitance element C1). It is to be noted that the AC rectangular wave Sg corresponds to an AC drive signal VcomAC, or a touch detection drive signal Vcomt, described later.

Figure 1:
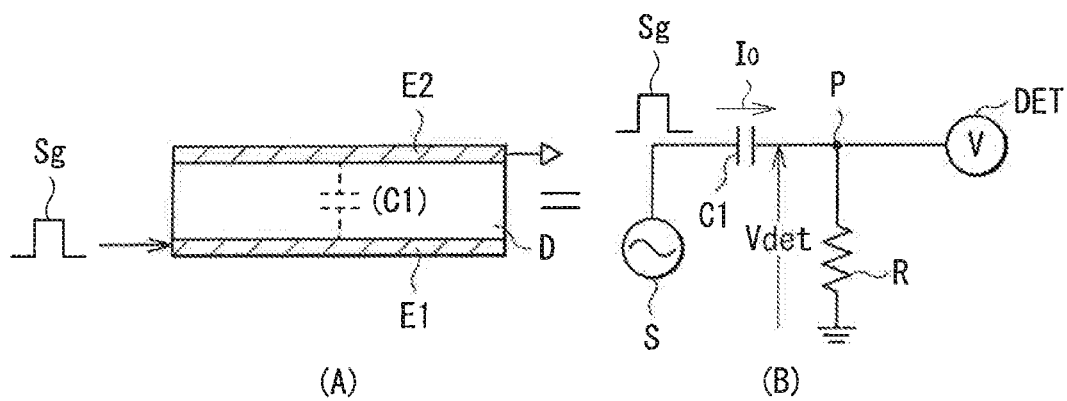
FIG. 1 is a diagram for explaining a basic principle of a touch detection method of a display unit with a touch detection function according to embodiments of the disclosure, showing a state where a finger is not in contact with or not in proximity to the display device.

In a state where a finger is not in contact with (or not in proximity to) the display device, current I0 corresponding to a capacitance value of the capacitance element C1 flows in accordance with charge and discharge with respect to the capacitance element C1 as illustrated in FIG. 1. Here, a potential waveform at the other end P of the capacitance element C1 is, for example, as shown by a waveform V0 in (A) of FIG. 3, which is detected by a voltage detector DET.

Figure 2:
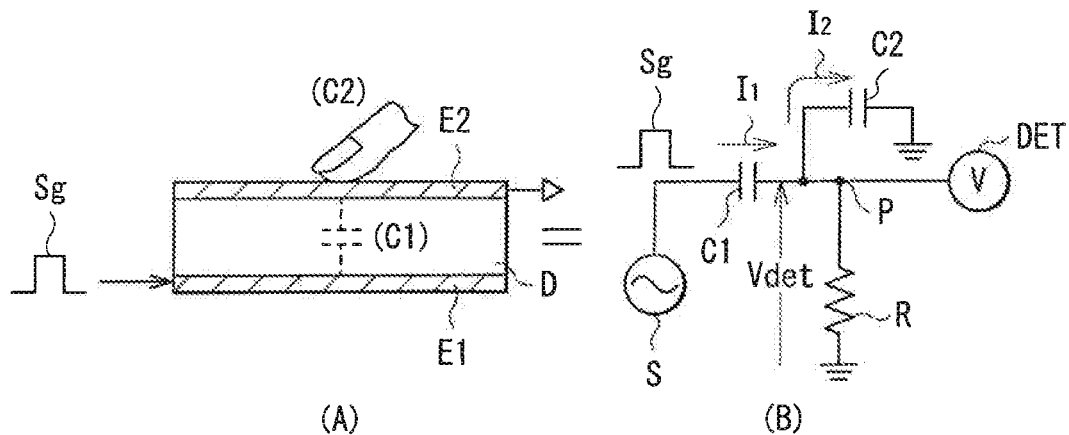
FIG. 2 is a diagram for explaining the basic principle of the touch detection method of the display unit with a touch detection function according to the embodiment of the disclosure, showing a state where a finger is in contact with or in proximity to the display device.
Figure 3:
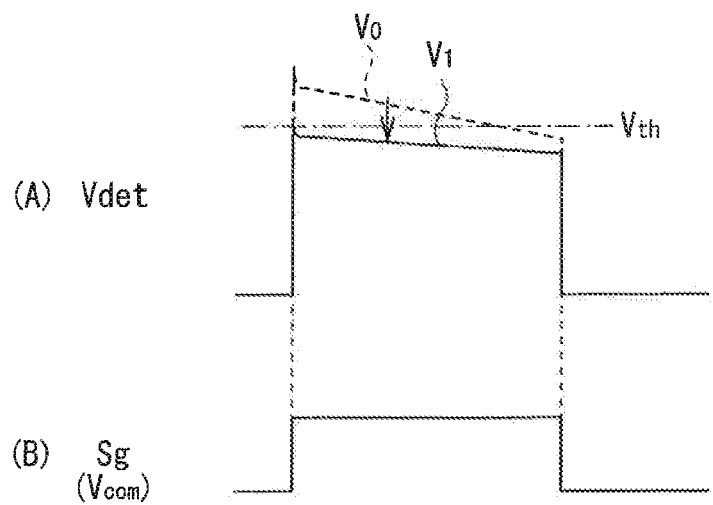
FIG. 3 is a diagram for explaining the basic principle of the touch detection method of the display unit with a touch detection function according to the embodiments of the disclosure, showing an example of a waveform of each of a drive signal and a touch detection signal.

On the other hand, in a state where a finger is in contact with (or in proximity to) the display device, a capacitance element C2 is formed by a finger and added in series to the capacitance element C1 as illustrated in FIG. 2. In the state, current I1 and current I2 flow in accordance with charge and discharge of the capacitance elements C1 and C2, respectively. Here, a potential waveform at the other end P of the capacitance element C1 is, for example, as shown by a waveform V1 in (A) of FIG. 3, which is detected by the voltage detector DET. Here, electric potential of the point P corresponds to a divided potential determined by values of the current I1 and the current I2 flowing through the capacitance elements C1 and C2. The waveform V1 is therefore smaller in value compared with the waveform V0 in the state of no contact. The voltage detector DET compares a detected voltage with a predetermined threshold voltage Vth. When the detected voltage is equal to or higher than the threshold voltage, the voltage detector determines that no contact occurs. When the detected voltage is lower than the threshold voltage, the voltage detector determines that contact occurs. In this way, touch detection may be performed.

2. First Embodiment

Configuration Example

General Configuration Example

Figure 4:
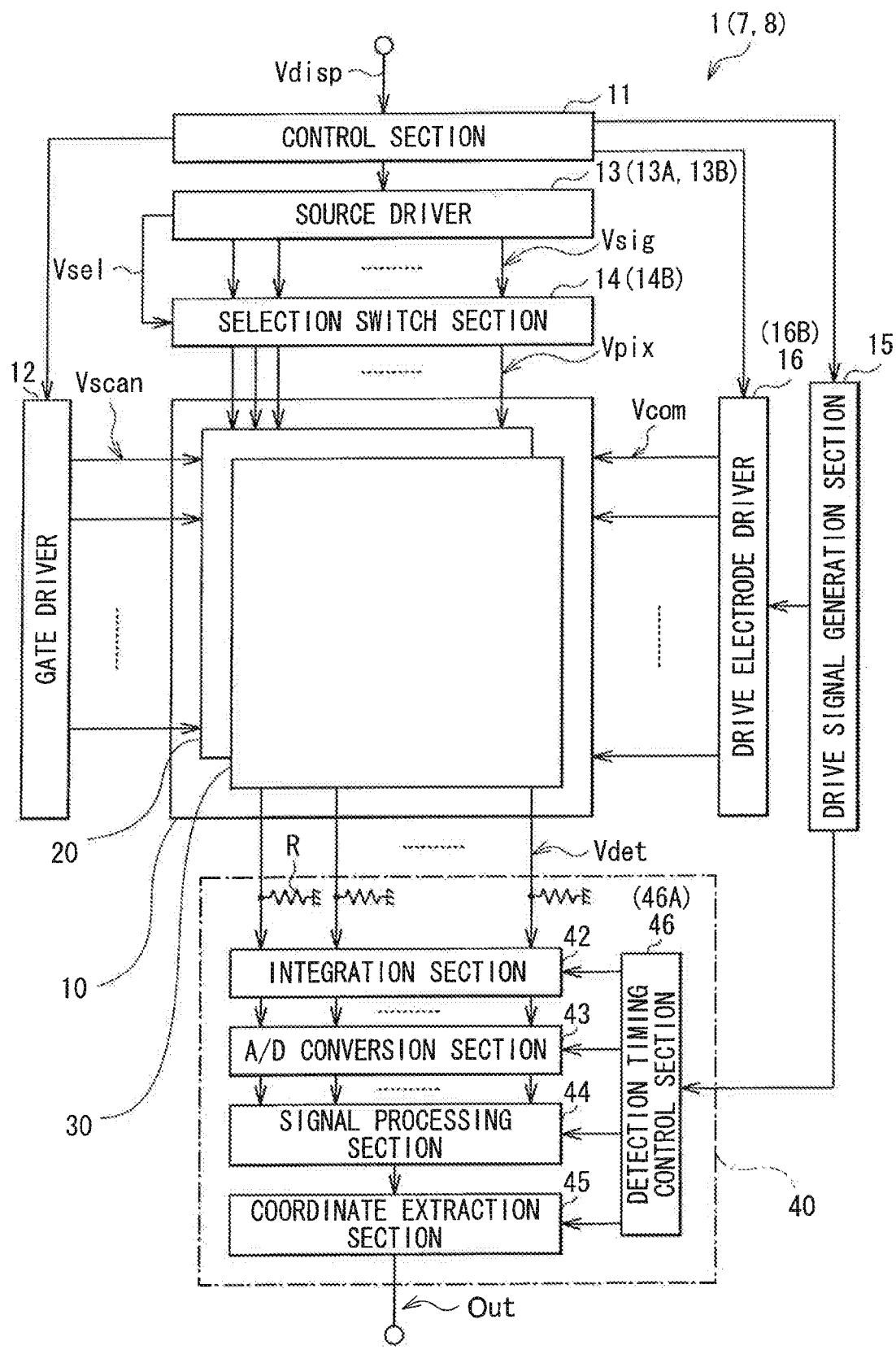
FIG. 4 is a block diagram illustrating a configuration example of the display unit with a touch detection function according to the embodiments of the disclosure.

FIG. 4 illustrates a configuration example of a display unit with a touch detection function according to a first embodiment of the disclosure. The display unit uses a liquid crystal display element as a display element, and is a so-called in-cell type unit, in which a liquid crystal display device configured by the liquid crystal display element is integrated with a capacitance-type touch detection device.

The display unit with a touch detection function 1 includes a control section 11, a gate driver 12, a source driver 13, a selection switch section 14, a drive signal generation section 15, a drive electrode driver 16, a display device with a touch detection function 10, and a touch detection section 40.

The control section 11 is a circuit supplying a control signal to each of the gate driver 12, the source driver 13, the drive signal generation section 15, the drive electrode driver 16, and the touch detection section 40 based on a video signal Vdisp supplied from the outside, and thus controls those to operate in synchronization with one another.

The gate driver 12 has a function of sequentially selecting one horizontal line as a display drive object in the display device with a touch detection function 10 based on the control signal supplied from the control section 11. Specifically, the gate driver 12 applies a scan signal Vscan to a gate of a TFT element Tr of each pixel Pix through a scan signal line GCL to sequentially select, as a display drive object, one row, or one horizontal line, of pixels Pix formed in a matrix in a liquid crystal display device 20 of the display device with a touch detection function 10.

The source driver 13 generates and outputs a pixel signal Vsig based on a video signal and a control signal supplied from the control section 11. Specifically, the source driver 13 generates, from video signals corresponding to one horizontal line, the pixel signal Vsig in which pixel signals Vpix for a plurality of (in this example, six) sub pixels SPix of the liquid crystal display device 20 of the display device with a touch detection function 10 are time divisionally multiplexed, and supplies the pixel signal Vsig to the selection switch section 14, as described later. In addition, the source driver 13 generates switch control signals Vsel (VselR1, VselG1, VselB1, VselR2, VselG2, and VselB2) necessary for demultiplexing the pixel signals Vpix multiplexed into the pixel signal Vsig, and supplies the switch control signals Vsel together with the pixel signal Vsig to the selection switch section 14. It is to be noted that such multiplexing is performed to reduce the number of wiring lines between the source driver 13 and the selection switch section 14.

The selection switch section 14 demultiplexes the pixel signals Vpix, which have been time-divisionally-multiplexed into the pixel signal Vsig, based on the pixel signal Vsig and the switch control signals Vsel supplied from the source driver 13, and supplies the pixel signals Vpix to the liquid crystal display device 20 of the display device with a touch detection function 10.

Figure 5:
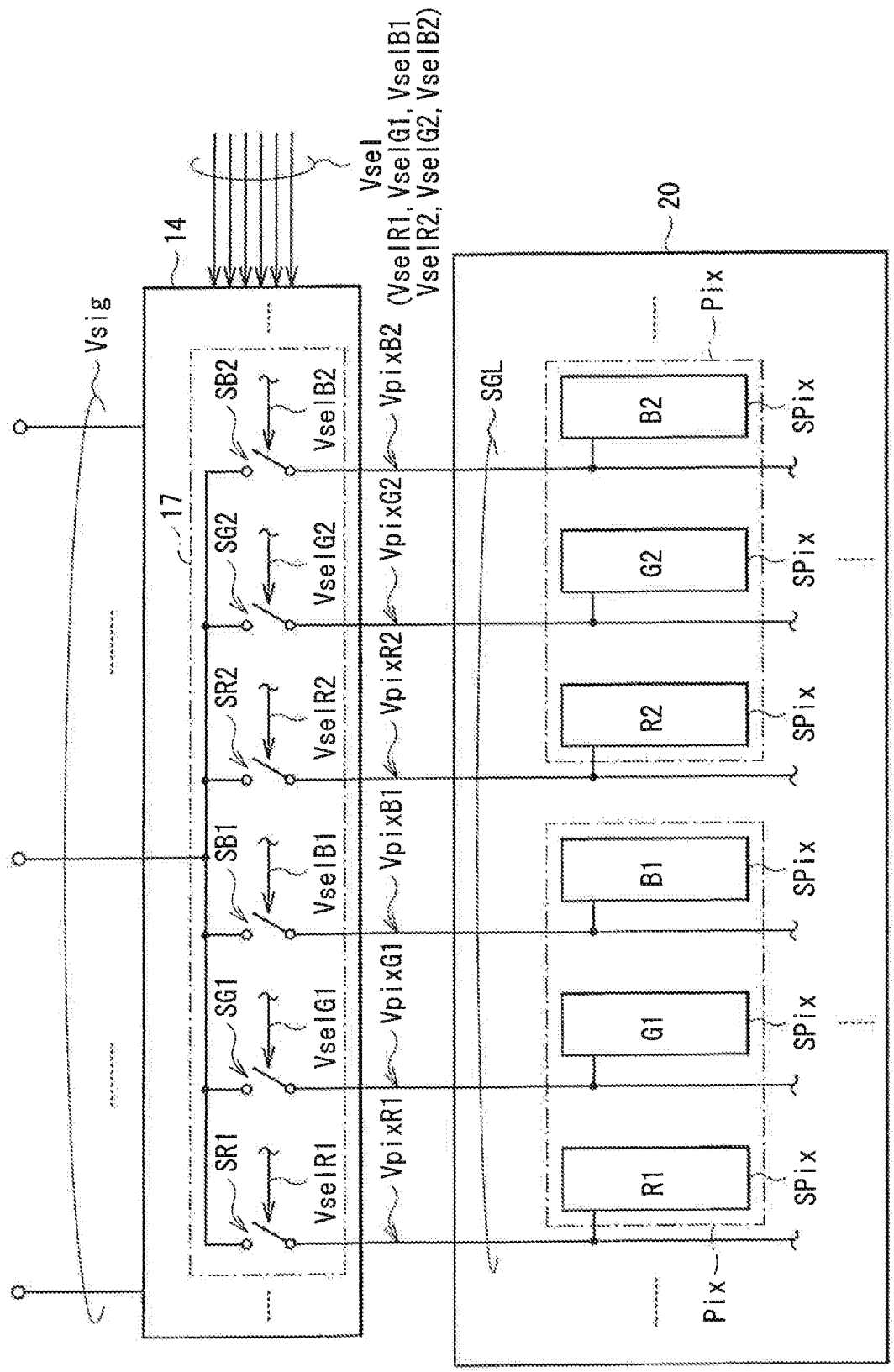
FIG. 5 is a block diagram illustrating a configuration example of a selection switch section according to a first embodiment.

FIG. 5 illustrates a configuration example of the selection switch section 14. The selection switch section 14 has a plurality of switch groups 17. In this example, each switch group 17 includes six switches SR1, SG1, SB1, SR2, SG2, and SB2, where respective one ends of the switches are connected to one another and supplied with a pixel signal Vsig from the source driver 13, and respective the other ends thereof are connected to six sub pixels SPix (red (R1 and R2), green (G1 and G2), and blue (B1 and B2)) through pixel signal lines SGL of the liquid crystal display device 20 of the display device with a touch detection function 10. The respective six switches SR1, SG1, SB1, SR2, SG2, and SB2 are controlled to be on or off by the switch control signals Vsel (VselR1, VselG1, VselB1, VselR2, VselG2, and VselB2) supplied from the source driver 13. According to such a configuration, the selection switch section 14 sequentially changes the six switches in a time-divisional manner to be on in accordance with the switch control signals Vsel, thereby demultiplexes the pixel signals Vpix (VpixR1, VpixG1, VpixB1, VpixR2, VpixG2, and VpixB2) from the pixel signal Vsig multiplexed with the signals Vpix. In addition, the selection switch section 14 supplies the respective pixel signals Vpix to the six sub pixels SPix (R1, G1, B1, R2, G2, and B2).

The drive signal generation section 15 generates a drive signal Vcom based on a control signal supplied from the control section 11. Specifically, the drive signal generation section 15 generates an AC drive signal VcomAC and a DC drive signal VcomDC, and supplies the signals to the drive electrode driver 16. The AC drive signal VcomAC has an AC rectangular waveform. The DC drive signal VcomDC has a voltage equivalent to the time average value of the AC drive signal VcomAC.

The drive electrode driver 16 is a circuit supplying the drive signal Vcom to each drive electrode COML (described later) of the display device with a touch detection function 10 based on a control signal supplied from the control section 11. Specifically, in display operation, the drive electrode driver 16 applies the AC drive signal VcomAC as a display drive signal Vcomd to a drive electrode COML corresponding to one horizontal line participating in the display operation, as described later. That is, the liquid crystal display device 20 of the display device with a touch detection function 10 is driven by line inversion drive. In touch detection operation, the drive electrode driver 16 applies the AC drive signal VcomAC as a touch detection drive signal Vcomt to a plurality of drive electrodes COML participating in the touch detection operation. In addition, the drive electrode driver 16 applies the DC drive signal VcomDC to drive electrodes COML other than the drive electrodes applied with the AC drive signal VcomAC.

The display device with a touch detection function 10 is a display device in which a touch detection function is embedded. The display device with a touch detection function 10 includes the liquid crystal display device 20 and a touch detection device 30. The liquid crystal display device 20 performs sequential scan for each horizontal line for performing display in accordance with scan signals Vscan supplied from the gate driver 12, as described later. The touch detection device 30 operates based on the above-described basic principle of capacitance-type touch detection and outputs a touch detection signal Vdet. The touch detection device 30 performs sequential scan for performing touch detection in accordance with touch detection drive signals Vcomt supplied from the drive electrode driver 16, as described later.

The touch detection section 40 is a circuit that detects presence of a touch event in the touch detection device 30 based on a control signal supplied from the control section 11 and the touch detection signal Vdet supplied from the touch detection device 30 of the display device with a touch detection function 10, and, if a touch event is detected, obtains coordinates of the touch event in a touch detection region. The touch detection section 40 includes an integration section 42, an A/D conversion section 43, a signal processing section 44, a coordinate extraction section 45, and a detection timing control section 46. The integration section 42, which integrates each of touch detection signals Vdet supplied from the touch detection device 30 and outputs the integrated signal, is configured of a plurality of integration circuits 50 (described later). A resistance R for providing a DC potential (0 V) is connected between each of input terminals of the integration section 42 and ground. The A/D conversion section 43 is a circuit that samples each of analog signals outputted from the integration section 42 at a timing in synchronization with the touch detection drive signal Vcomt, and converts the analog signal to a digital signal. The signal processing section 44 is a logical circuit that detects presence of a touch event in the touch detection device 30 based on an output signal from the A/D conversion section 43. The coordinate extraction section 45 is a logical circuit that, when the signal processing section 44 detects a touch event, obtains touch-panel coordinates of the touch event. The detection timing control section 46 controls these circuits to operate in synchronization with one another.

Figure 6:
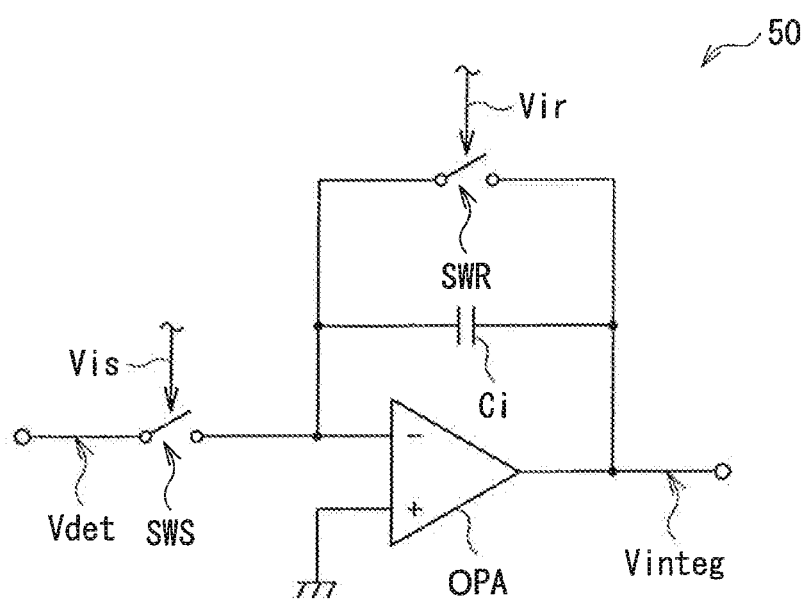
FIG. 6 is a circuit diagram illustrating a configuration example of an integration circuit according to the embodiments.

FIG. 6 illustrates a configuration example of one of the integration circuits 50 configuring the integration section 42. The integration circuit 50 integrates the touch detection signal Vdet outputted from the touch detection device 30 of the display device with a touch detection function 10, and outputs such integrated signal as an integration output signal Vinteg. It is to be noted that generally, the integration circuit is often used for a detection circuit of a touch panel as described in Japanese Unexamined Patent Application Publication No. 2010-3060.

The integration circuit 50 includes an operational amplifier OPA, a capacitance element Ci, a reset switch SWR, and a read switch SWS. The operational amplifier OPA is a circuit that amplifies and outputs a difference in input voltage between a positive input terminal (+) and a negative input terminal (−). In this example, the positive input terminal (+) of the operational amplifier OPA is grounded. The capacitance element Ci is inserted between the negative input terminal (−) and an output terminal of the operational amplifier OPA. The reset switch SWR is inserted between the negative input terminal (−) and the output terminal of the operational amplifier OPA, and controlled to be on or off by a reset signal Vir supplied from the detection timing control section 46. The read switch SWS is connected at one end to the touch detection electrode TDL so as to be supplied with the touch detection signal Vdet, and connected at the other end to the negative input terminal (−) of the operational amplifier OPA, so that the read switch SWS is controlled to be on or off by the read signal Vis supplied from the detection timing control section 46.

According to such a configuration, when the read switch SWS is on and the reset switch SWR is off, the integration circuit 50 integrates the inputted touch detection signal Vdet, and outputs a result of such integration as an output signal Vinteg. Also when the read switch SWS is off, the integration circuit 50 separates the touch detection electrode TDL from the operational amplifier OPA. Moreover when the reset switch SWR is on, the integration circuit 50 resets the circuit 50 itself by discharging electric charges stored in the capacitance element Ci through the reset switch SWR.

(Display Device with Touch Detection Function 10)

Next, a configuration example of the display device with a touch detection function 10 is described in detail.

Figure 7:
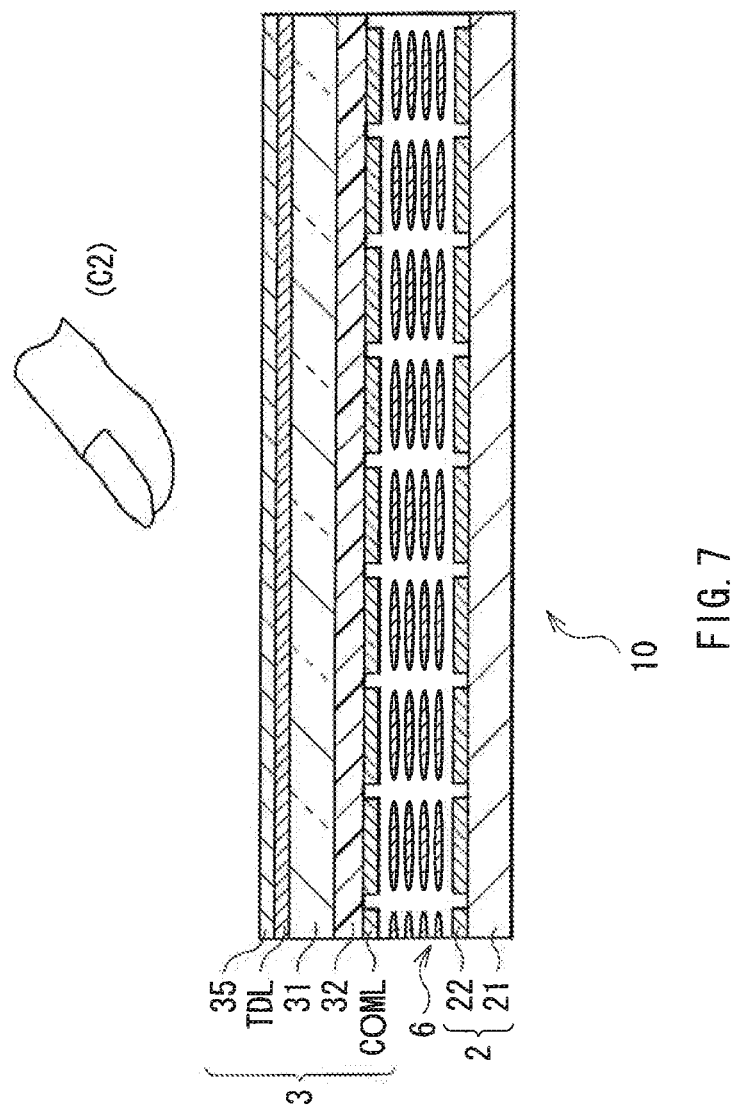
FIG. 7 is a section diagram illustrating a schematic section structure of a display device with a touch detection function according to the embodiments.

FIG. 7 illustrates an example of a relevant-part section structure of the display device with a touch detection function 10. The display device with a touch detection function 10 includes a pixel substrate 2, a counter substrate 3 disposed to face the pixel substrate 2, and a liquid crystal layer 6 inserted between the pixel substrate 2 and the counter substrate 3.

The pixel substrate 2 includes a TFT substrate 21 as a circuit board, and a plurality of pixel electrodes 22 arranged in a matrix on the TFT substrate 21. While not shown, thin film transistors (TFTs) for respective pixels, and wiring lines including the pixel signal lines SGL for supplying the image signals Vpix to the respective pixel electrodes 22 and the scan signal lines GCL for driving the respective TFTs, are formed on the TFT substrate 21.

The counter substrate 3 includes a glass substrate 31, a color filter 32 formed on one surface of the glass substrate 31, and a plurality of drive electrodes COML formed on the color filter 32. The color filter 32 is configured of, for example, color filter layers of three colors of red (R), green (G), and blue (B) arranged periodically, where a set of three colors of R, G, and B is set in correspondence to each display pixel. The drive electrodes COML act as common drive electrodes of the liquid crystal display device 20, and also act as drive electrodes of the touch detection device 30. In this example, the drive electrodes COML are disposed in such a manner that one drive electrode COML is corresponding to one pixel electrode 22 (pixel electrode 22 configuring one row). Each drive electrode COML is configured of, for example, ITO (Indium Tin Oxide). The drive electrode COML is connected to the TFT substrate 21 via a not-shown contact conductive post, and the drive signal Vcom is applied from the TFT substrate 21 to the drive electrode COML through the contact conductive post. The touch detection electrode TDL as a detection electrode of the touch detection device 30 is formed on the other surface of the glass substrate 31. The touch detection electrode TDL is configured of, for example, ITO in the same way as the drive electrode COML. Furthermore, a polarizing plate 35 is disposed on the touch detection electrode TDL.

The liquid crystal layer 6 modulates light passing through the liquid crystal layer 6 depending on a state of an electric field, and various modes of liquid crystal, including TN (Twisted Nematic), VA (Vertical Alignment), and ECB (Electrically Controlled Birefringence), may be used for the liquid crystal layer 6.

It is to be noted that an alignment film is provided between the liquid crystal layer 6 and the pixel substrate 2 and between the liquid crystal layer 6 and the counter substrate 3, and an incidence-side polarizing plate is disposed on a bottom side of the pixel substrate 2, which are omitted to be shown here.

Figure 8:
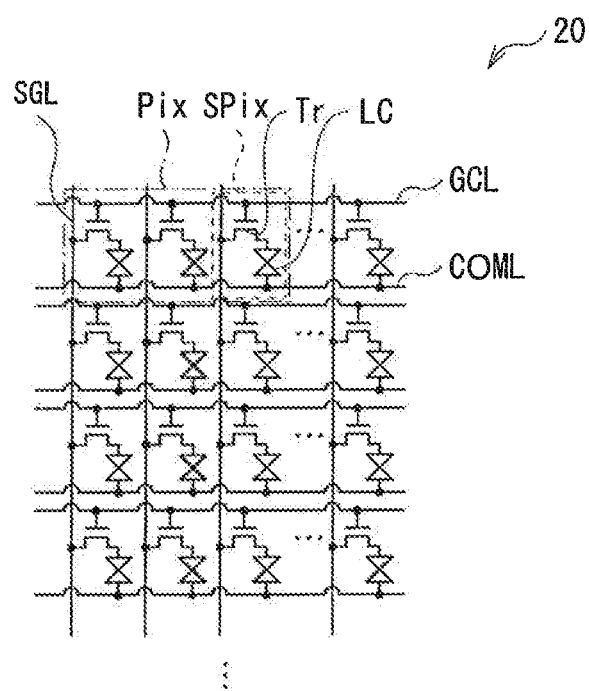
FIG. 8 is a circuit diagram illustrating a pixel arrangement in the display device with a touch detection function according to the embodiments.

FIG. 8 illustrates a configuration example of a pixel structure of the liquid crystal display device 20. The liquid crystal display device 20 has a plurality of pixels Pix arranged in a matrix. Each pixel Pix is configured of three sub pixels SPix. The respective, three sub pixels SPix are disposed in correspondence to the three colors (RGB) of the color filter 32 shown in FIG. 7. Each sub pixel SPix has a TFT element Tr and a liquid crystal element LC. The TFT element Tr is configured of a thin film transistor, and includes n-channel MOS (Metal Oxide Semiconductor) TFT in this example. A source of the TFT element Tr is connected to the pixel signal line SGL, a gate thereof is connected to the scan signal line GCL, and a drain thereof is connected to one end of the liquid crystal element LC. The liquid crystal element LC is connected at one end to the drain of the TFT element Tr, and connected at the other end to the drive electrode COML.

The sub pixel SPix is connected mutually with other sub pixels SPix on the same row of the liquid crystal display device 20 through the scan signal line GCL. The scan signal line GCL is connected to the gate driver 12 and supplies with the scan signal Vscan from the gate driver 12. In addition, the sub pixel SPix is connected mutually with other sub pixels SPix on the same column of the liquid crystal display device 20 through the pixel signal line SGL. The pixel signal line SGL is connected to the selection switch section 14 and is supplied with the pixel signal Vpix from the selection switch section 14.

Furthermore, the sub pixel SPix is connected mutually with other sub pixels SPix on the same row of the liquid crystal display device 20 through the drive electrode COML. The drive electrode COML is connected to the drive electrode driver 16 and is supplied with the drive signal Vcom from the drive electrode driver 16.

According to such a configuration, in the liquid crystal display device 20, the gate driver 12 drives the scan signal lines GCL to perform line-sequential scanning in a time-divisional manner, thereby one horizontal line is sequentially selected, and the source driver 13 and the selection switch section 14 supply the pixel signals Vpix to pixels Pix on the one horizontal line, so that display is performed by one horizontal line basis.

Figure 9:
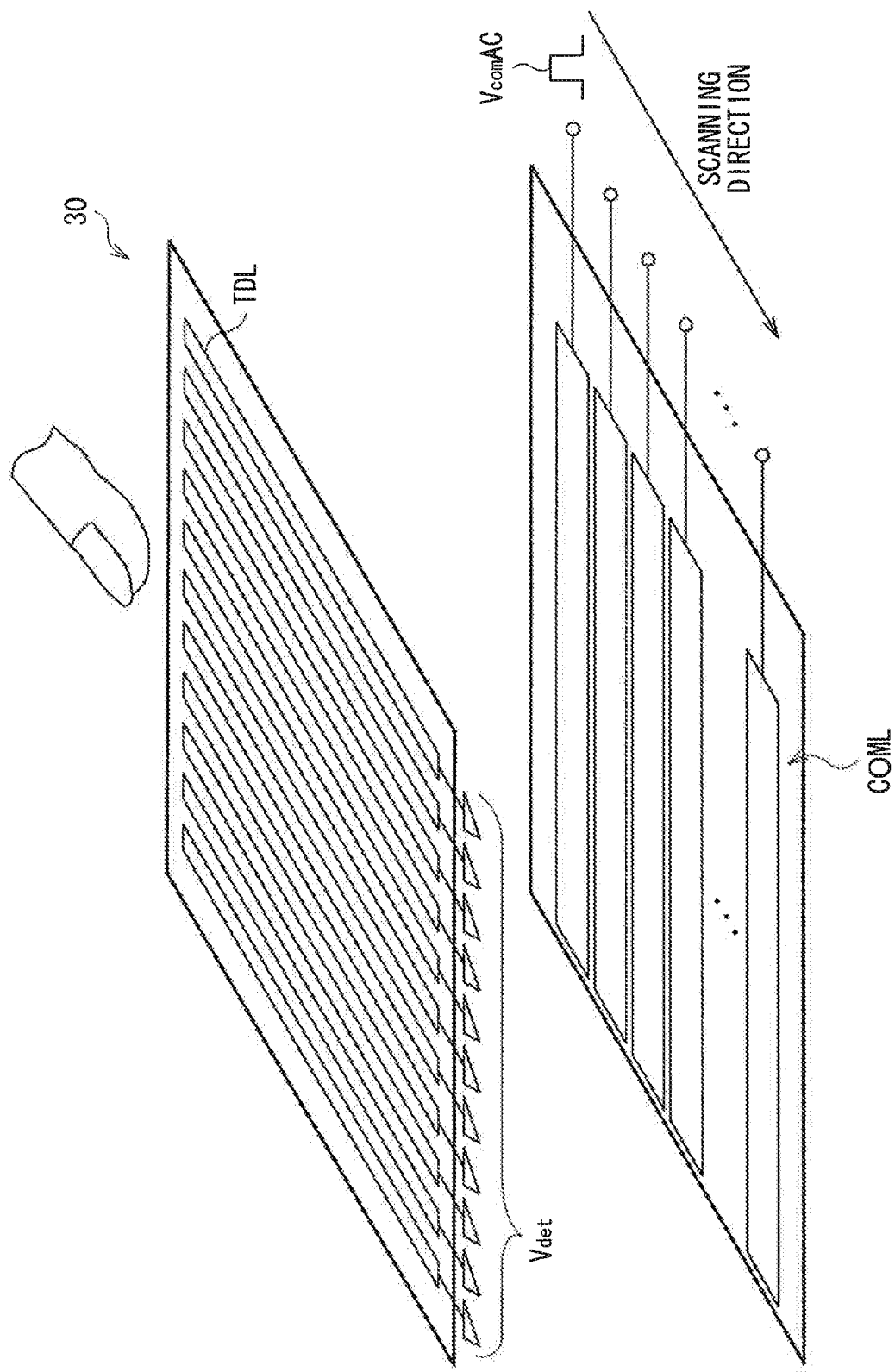
FIG. 9 is a perspective diagram illustrating a configuration example of drive electrodes and touch detection electrodes of the display device with a touch detection function according to the embodiments.

FIG. 9 perspectively illustrates a configuration example of the touch detection device 30. The touch detection device 30 is configured of the drive electrode COML and the touch detection electrode TDL provided on the counter substrate 3. The drive electrode COML is configured as a plurality of stripe-shaped electrode patterns extending in a horizontal direction in the figure. In touch detection operation, the AC drive signal VcomAC, or the touch detection drive signal Vcomt, is sequentially supplied to each of the electrode patterns by the drive electrode driver 16, so that sequential scan drive is performed in a time-divisional manner as described later. The touch detection electrode TDL is configured of stripe-shaped electrode patterns extending in a direction orthogonal to the extending direction of the electrode patterns of the drive electrode COML. Each of the electrode patterns of the touch detection electrode TDL is connected to input of the integration section 42 of the touch detection section 40. The electrode patterns of the drive electrode COML and the electrode patterns of the touch detection electrode TDL cross each other, and thus form capacitance at respective crossing spots.

According to such a configuration, in the touch detection device 30, the drive electrode driver 16 applies the drive signal VcomAC, or the touch detection drive signal Vcomt, to the drive electrode COML, thereby the touch detection electrode TDL outputs the touch detection signal Vdet, and touch detection is thus performed. That is, the drive electrode COML corresponds to the drive electrode E1 in the basic principle of touch detection illustrated in FIGS. 1 to 3, and the touch detection electrode TDL corresponds to the touch detection electrode E2. The touch detection device 30 detects a touch event in accordance with the basic principle. As illustrated in FIG. 9, a capacitance-type touch sensor is formed in a matrix by the electrode patterns crossing each other. Accordingly, a position of the touch event or proximity of an external proximity object may be detectable by scanning the whole touch detection surface of the touch detection device 30.

Figure 10:
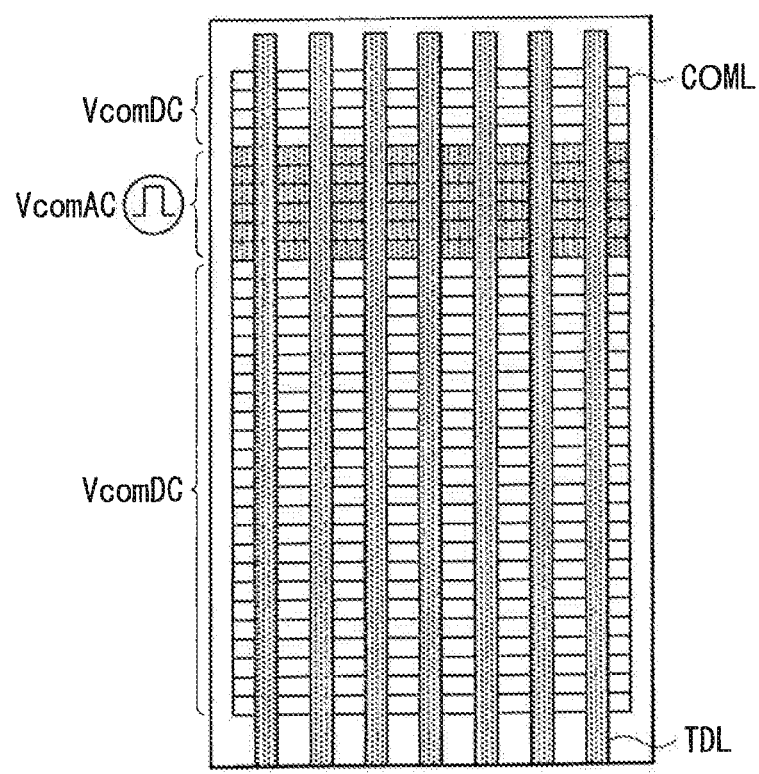
FIG. 10 is a schematic diagram illustrating an operation example of the display unit with a touch detection function according to the embodiments.

FIG. 10 schematically illustrates touch detection scanning. As illustrated in FIG. 10, in touch detection operation, the drive electrode driver 16 applies the AC drive signal VcomAC as the touch detection drive signal Vcomt to a plurality of drive electrodes COML, and applies the DC drive signal VcomDC to drive electrodes COML other than the drive electrodes COML applied with the AC drive signal VcomAC. In addition, the drive electrode driver 16 shifts the drive electrodes COML to be applied with the AC drive signal VcomAC to perform touch detection scanning. Then the AC drive signal VcomAC is transmitted to the touch detection electrode TDL through the capacitance, and outputted as the touch detection signal Vdet.

The source driver 13 and the selection switch section 14 correspond to a specific example of "a pixel signal line drive section" of the disclosure. The liquid crystal element LC corresponds to a specific example of "a display element" of the disclosure. The read switch SWS corresponds to a specific example of "a detection switch" of the disclosure.

[Operations and Functions]

Next, operations and functions of the display unit with a touch detection function 1 according to the embodiment are described.

(Summary of General Operation)

First, summary of general operation of the display unit with a touch detection function 1 is described with reference to FIG. 4. The control section 11 supplies the control signal to each of the gate driver 12, the source driver 13, the drive signal generation section 15, the drive electrode driver 16, and the touch detection section 40 based on a video signal Vdisp supplied from the outside, and thus controls those to operate in synchronization with one another. The gate driver 12 supplies the scan signals Vscan to the liquid crystal display device 20 to sequentially select one horizontal line as a display drive object. The source driver 13 generates the pixel signal Vsig with the pixel signals Vpix multiplexed and the switch control signal Vsel corresponding to the pixel signal Vsig, and supplies the generated signals to the selection switch section 14. The selection switch section 14 demultiplexes the pixel signals Vpix based on the pixel signal Vsig and the switch control signal Vsel, and supplies the pixel signals Vpix to the respective pixels Pix configuring the one horizontal line. The drive signal generation section 15 generates the AC drive signal VcomAC and the DC drive signal VcomDC. In display operation, the drive electrode driver 16 sequentially applies the AC drive signal VcomAC as a display drive signal Vcomd to the drive electrode COML corresponding to the one horizontal line as the display drive object. In touch detection operation, the drive electrode driver 16 sequentially applies the AC drive signal VcomAC as a touch detection drive signal Vcomt to the plurality of drive electrodes COML participating in touch detection operation. In addition, the drive electrode driver 16 applies the DC drive signal VcomDC to drive electrodes COML other than the drive electrodes applied with the AC drive signal VcomAC. The display device with a touch detection function 10 performs display operation, and performs touch detection operation based on the touch detection drive signals Vcomt supplied from the drive electrode driver 16, and thus outputs the touch detection signal Vdet from the touch detection electrode TDL. In the touch detection period, the integration section 42 integrates the touch detection signal Vdet and outputs the integrated signal. The A/D conversion section 43 converts the analog signal outputted from the integration section 42 to a digital signal. The signal processing section 44 detects presence of a touch event to the display device with a touch detection function 10 based on the output signal from the A/D conversion section 43. When the signal processing section 44 detects a touch event, the coordinate extraction section 45 obtains touch-panel coordinates of the touch event. The detection timing control section 46 controls the integration section 42, the A/D conversion section 43, the signal processing section 44, and the coordinate extraction section 45 to operate in synchronization with one another.

(Detailed Operation)

Next, detailed operation of the display unit with a touch detection function 1 is described.

Figure 11:
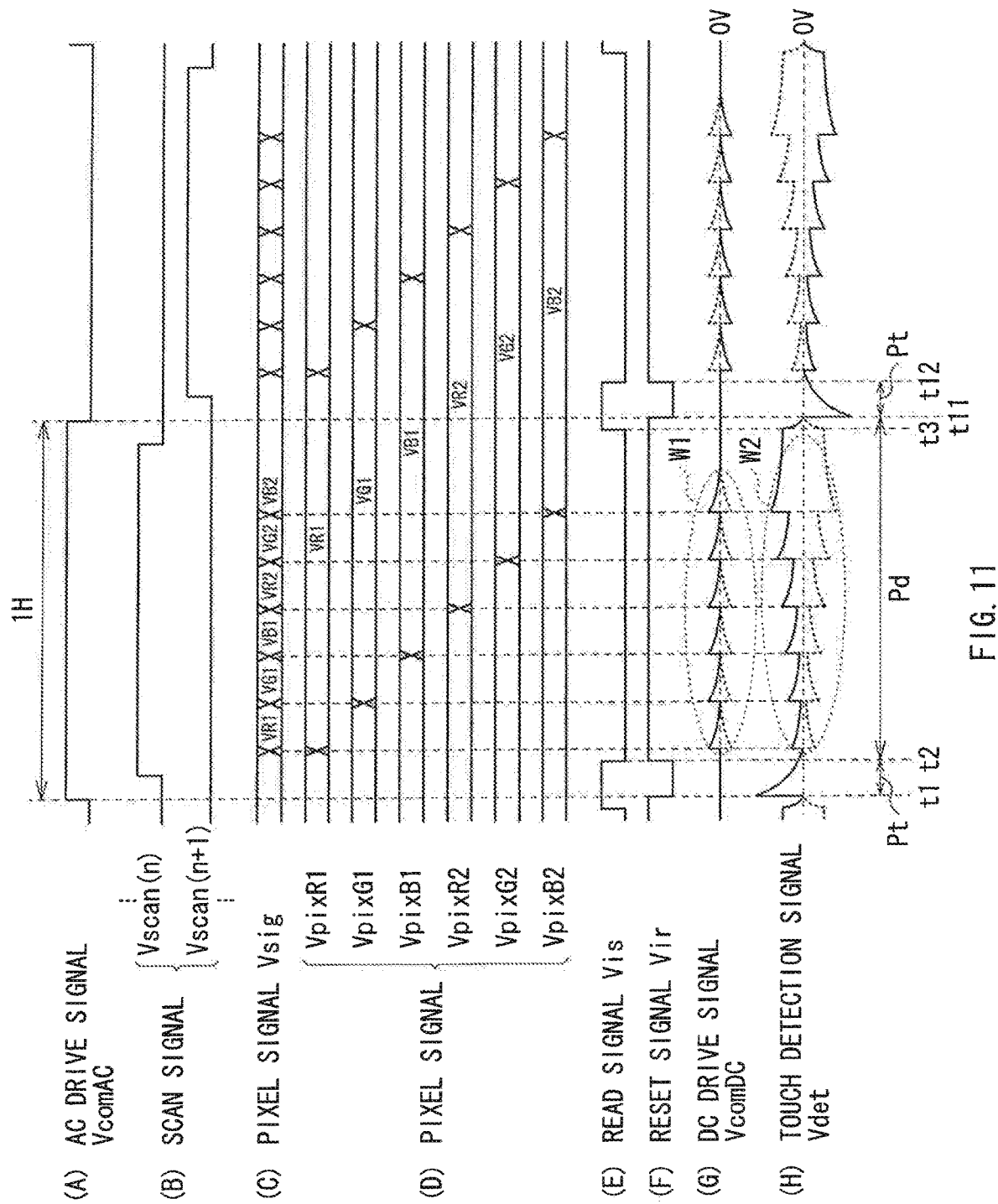
FIG. 11 is a timing waveform chart illustrating an operation example of the display unit with a touch detection function according to the first embodiment.

FIG. 11 illustrates a timing waveform example of the display unit with a touch detection function 1, where (A) illustrates a waveform of the AC drive signal VcomAC, (B) illustrates a waveform of the scan signal Vscan, (C) illustrates a waveform of the pixel signal Vsig, (D) illustrates respective waveforms of the pixel signals Vpix, (E) illustrates a waveform of the read signal Vis, (F) illustrates a waveform of the reset signal Vir, (G) illustrates a waveform of the DC drive signal VcomDC, and (H) illustrates a waveform of the touch detection signal Vdet.

In each horizontal period (1H), the display unit with a touch detection function 1 performs display operation during a display period Pd and touch detection operation during a touch detection period Pt. In the display operation, the gate driver 12 sequentially applies the scan signals Vscan to scan signal lines GCL, and the drive electrode driver 16 sequentially applies the AC drive signal VcomAC, or the display drive signal Vcomd, to drive electrodes COML corresponding to the scan signal lines GCL, so that display scan is performed. In the touch detection operation, the drive electrode driver 16 sequentially applies the AC drive signal VcomAC, or the touch detection drive signal Vcomt, to the plurality of drive electrodes COML, so that touch detection scan is performed, and the touch detection section 40 detects a touch event based on the touch detection signal Vdet outputted from the touch detection electrode TDL. These are described in detail below.

First, at timing t1, the drive electrode driver 16 applies the AC drive signal VcomAC to each of drive electrodes COML participating in display operation and in touch detection operation. Specifically, the drive signal generation section 15 changes voltage of the AC drive signal VcomAC from a low level to a high level ((A) of FIG. 11), and the drive electrode driver 16 applies the AC drive signal VcomAC, as the display drive signal Vcomd, to the drive electrodes COML participating in display operation, and one horizontal period is thus started. Concurrently, the drive electrode driver 16 applies the AC drive signal VcomAC, as the touch detection drive signal Vcomt, to a plurality of drive electrodes COML participating in touch detection operation. The touch detection drive signal Vcomt is transmitted to the touch detection electrode TDL through capacitance between the drive electrode COML and the touch detection electrode TDL, causing a change in the touch detection signal Vdet ((H) of FIG. 11).

Next, the gate driver 12 applies a scan signal Vscan(n) to a scan signal line GCL (n) in the nth row, and the scan signal Vscan(n) is changed from a low level to a high level ((B) of FIG. 11).

Next, at timing t2, the detection timing control section 46 changes the read signal Vis from a high level to a low level, and concurrently changes the reset signal Vir from a low level to a high level ((E) and (F) of FIG. 11). As a result, in the integration section 42 of the touch detection section 40, the read switch SWS of the integration circuit 50 is turned into an off state, and the reset switch SWR thereof is turned into an on state. That is, the integration circuit 50 is turned into a reset operation state.

Figure 12A:
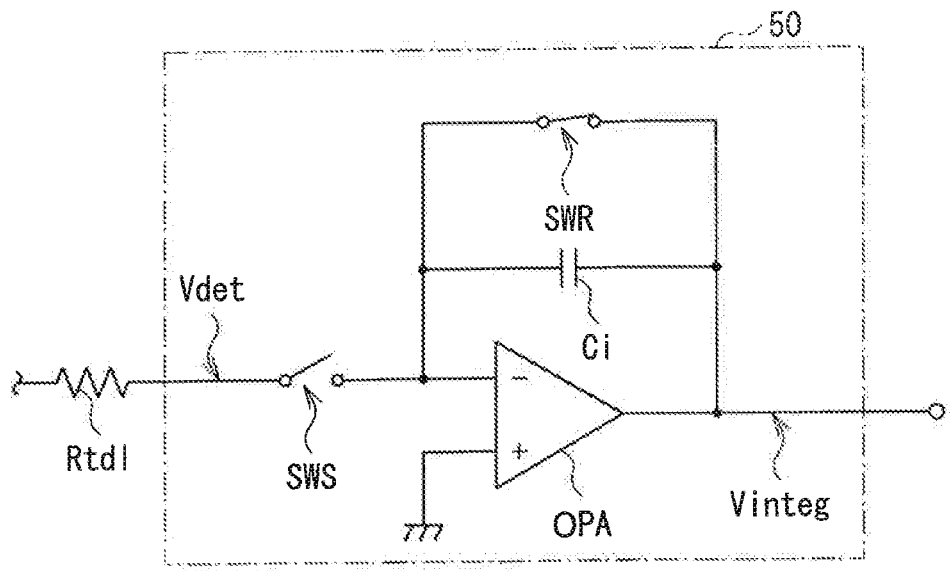
FIGS. 12A and 12B are circuit diagrams illustrating an operation example of a integration circuit according to the first embodiment.

FIG. 12A illustrates the reset operation state of the integration circuit 50. As illustrated in FIG. 12A, in the reset operation state, the operational amplifier OPA is separated from the touch detection electrode TDL, and both ends of the capacitance element Ci are short-circuited. Accordingly, an integration result of the integration circuit 50 is reset. A resistance Rtd1 is a resistance component of the touch detection electrode TDL.

Next, the source driver 13 and the selection switch section 14 sequentially apply the pixel signals Vpix to the pixel signal lines SGL ((D) of FIG. 11) to perform display corresponding to one horizontal line. Specifically, first, the source driver 13 generates a pixel signal Vsig ((C) of FIG. 11) and a switch control signal Vsel (not shown), and supplies the signals to the selection switch section 14. The selection switch section 14 demultiplexes the pixel signals Vpix (VpixR1, VpixG1, VpixB1, VpixR2, VpixG2, and VpixB2), which have been time-divisionally-multiplexed into the pixel signal Vsig, based on the pixel signal Vsig and the switch control signal Vsel, and supplies the pixel signals Vpix to the respective sub pixels SPix through the pixel signal lines SGL of the liquid crystal display device 20 ((D) of FIG. 11), so that display is performed in correspondence to one horizontal line.

Here, each pixel signal Vpix is transmitted to the touch detection electrode TDL through direct and indirect coupling between the pixel signal line SGL and the touch detection electrode TDL as described later, and shown as noise in the touch detection signal Vdet (waveform W2 in (H) of FIG. 11). In (H) of FIG. 11, a solid line indicates a waveform of the touch detection signal Vdet, for example, in the case that a pixel signal Vpix for instructing black display is applied to the pixel signal lines SGL, and a dashed line indicates a waveform of the touch detection signal Vdet, for example, in the case that a pixel signal Vpix for instructing white display is applied to the pixel signal lines SGL. In this way, in the display period Pd, a voltage level of the touch detection signal Vdet is shifted in different voltage directions depending on display content. Such voltage shift of the touch detection signal Vdet is corrected in a period from timing t3 to timing t11 as described later.

Next, the gate driver 12 changes the scan signal Vscan(n) of the scan signal line GCL (n) in the nth row from a high level to a low level ((B) of FIG. 11).

Next, at timing t3, the detection timing control section 46 changes the read signal Vis from a low level to a high level ((E) of FIG. 11). As a result, in the integration section 42 of the touch detection section 40, the read switch SWS of the integration circuit 50 is turned into an on state, and thus the operational amplifier OPA is connected to the touch detection electrode TDL, so that a virtual short-circuit voltage (0 V) of a negative-input terminal of the operational amplifier OPA is applied to the touch detection electrode TDL ((H) of FIG. 11). That is, the voltage shift of the touch detection signal Vdet described above is corrected.

Next, at timing t11, the drive electrode driver 16 applies the AC drive signal VcomAC to the drive electrodes COML participating in display operation and in touch detection operation. Specifically, the drive signal generation section 15 changes the voltage of the AC drive signal VcomAC from a high level to a low level ((A) of FIG. 11), and the drive electrode driver 16 applies the AC drive signal VcomAC, as the display drive signal Vcomd, to the drive electrodes COML participating in display operation, and next one horizontal period is thus started. Concurrently, the drive electrode driver 16 applies the AC drive signal VcomAC, as the touch detection drive signal Vcomt, to a plurality of drive electrodes COML participating in touch detection operation. The touch detection drive signal Vcomt is transmitted to the touch detection electrode TDL through capacitance between the drive electrode COML and the touch detection electrode TDL, and the touch detection signal Vdet is thus changed and then converges to 0 V ((H) of FIG. 11).

At the timing t11, the detection timing control section 46 changes the reset signal Vir from a high level to a low level ((F) of FIG. 11). As a result, the reset switch SWR of the integration circuit 50 is turned into an off state in the integration section 42 of the touch detection section 40. That is, the integration circuit 50 is turned into an integration operation state, and the touch detection period Pt is thus started.

Figure 12B:
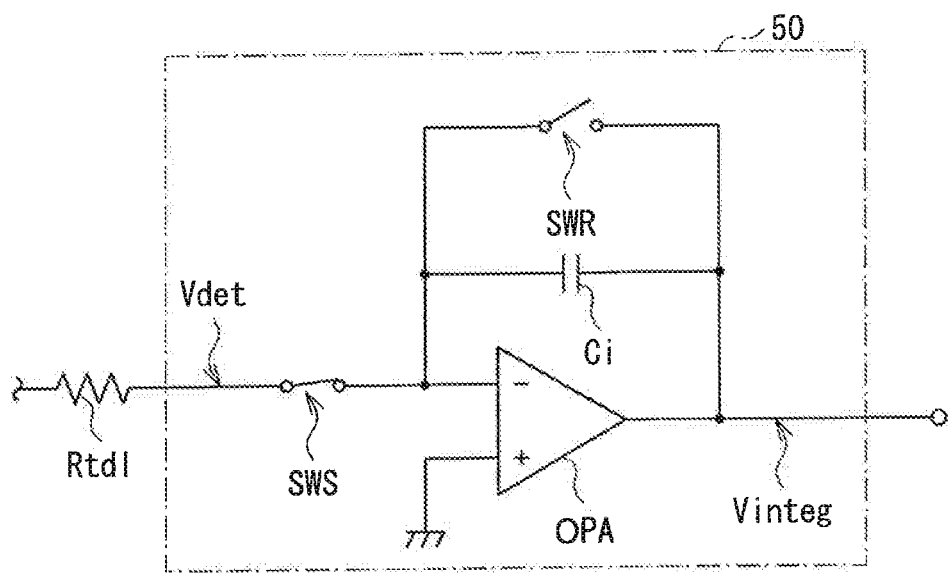

FIG. 12B illustrates the integration operation state of the integration circuit 50. As illustrated in FIG. 12B, in the integration operation state, the operational amplifier OPA is connected to the touch detection electrode TDL, and both ends of the capacitance element Ci are disconnected from each other. Consequently, the integration circuit 50 integrates the touch detection signal Vdet.

During a period from the timing t11 to timing t12 (touch detection period Pt), the source driver 13 and the selection switch section 14 operate to maintain respective voltages of the pixel signal lines SGL (pixel signals Vsig and Vpix). The integration circuit 50 integrates the touch detection signal Vdet during the touch detection period Pt. The A/D conversion section 43 performs A/D conversion to a result of such integration. Consequently, touch detection is performed in a region corresponding to the drive electrodes COML applied with the touch detection drive signal Vcomt.

After that, the above operation is repeated, thereby the display unit with a touch detection function1 performs display operation through scan of the whole display surface, and performs touch detection operation through scan of the whole touch-detection surface.

(Coupling Between Pixel Signal Line SGL and Touch Detection Electrode TDL)

In the display period Pd, noise is shown in the touch detection signal Vdet due to coupling between the pixel signal line SGL and the touch detection electrode TDL, as illustrated in (H) of FIG. 11. The coupling is described in detail below.

Figure 13A:
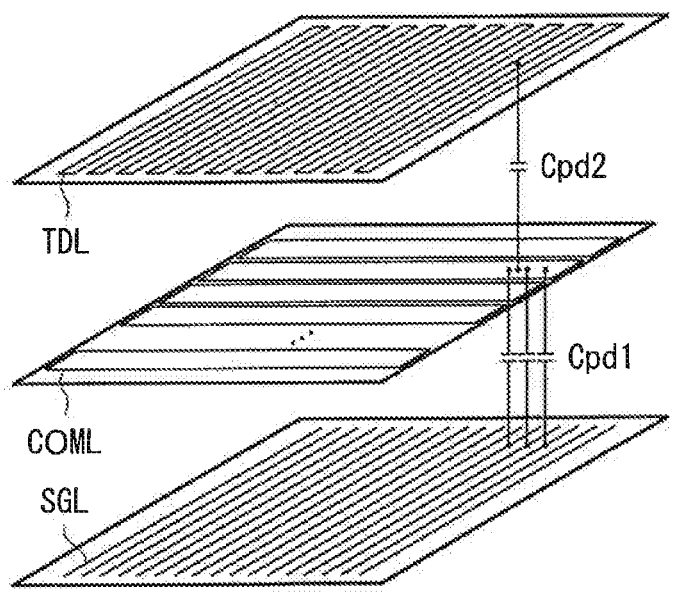
FIGS. 13A and 13B are schematic diagrams for explaining parasitic capacitance of the display device with a touch detection function according to the first embodiment.
Figure 13B:
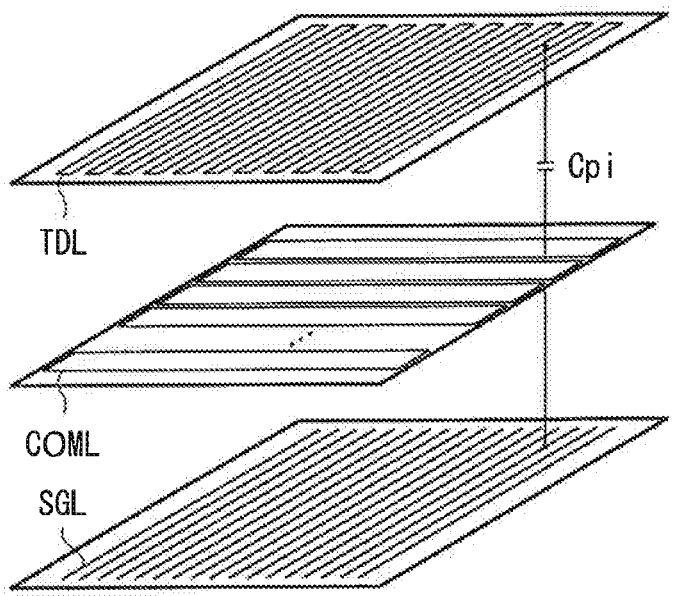

FIGS. 13A and 13B schematically illustrate coupling between the pixel signal line SGL and the touch detection electrode TDL, where FIG. 13A illustrates indirect coupling, and FIG. 13B illustrates direct coupling.

As illustrated in FIG. 13A, the pixel signal line SGL has parasitic capacitance Cpd1 between the pixel signal line SGL and the drive electrode COML, and the drive electrode COML has parasitic capacitance Cpd2 between the drive electrode COML and the touch detection electrode TDL. That is, the pixel signal line SGL and the touch detection electrode TDL are indirectly coupled with each other via the drive electrode COML.

Each drive electrode COML has the parasitic capacitance Cpd1 between the drive electrode COML and a plurality of pixel signal lines SGL as illustrated in FIG. 13A. Accordingly, a plurality of pixel signals Vpix applied to the plurality of pixel signal lines SGL are first transmitted to each of the drive electrodes COML through the parasitic capacitance Cpd1. Here, since each of the drive electrodes COML has a resistance component, for example, even if the DC drive signal VcomDC is applied, the pixel signal Vpix is shown as noise, for example, as illustrated in waveform W1 in (G) of FIG. 11. The noise is transmitted to the touch detection electrode TDL through the parasitic capacitance Cpd2. In this way, noise due to the six pixel signals Vpix ((D) of FIG. 11) is shown in the touch detection signal Vdet (waveform W2 in (H) of FIG. 11).

In addition, the pixel signal line SGL has parasitic capacitance Cpi between the pixel signal line SGL and the touch detection electrode TDL through a gap between the drive electrodes COML arranged in parallel, as illustrated in FIG. 13B. That is, the pixel signal line SGL and the touch detection electrode TDL are not only indirectly coupled as described above but also directly coupled with each other. In such direct coupling, the pixel signal Vpix applied to the pixel signal line SGL is transmitted to the touch detection electrode TDL through the parasitic capacitance Cpi. Accordingly, for example, in the display period Pd, the touch detection signal Vdet is shifted in different directions between black display (solid line) and white display (dashed line) as illustrated in (H) of FIG. 11.

In the display unit with a touch detection function 1, the read switch SWS is controlled to prevent touch detection operation from being affected by noise shown in the touch detection signal Vdet due to such coupling between the pixel signal line SGL and the touch detection electrode TDL. Next, functions of the embodiment are described in comparison with a comparative example.

Comparative Example

A display unit with a touch detection function 1R according to the comparative example is described below. The display unit with a touch detection function 1R is configured using an integration circuit without the read switch SWS. Other configurations are the same as in the embodiment (FIG. 4).

Figure 14:
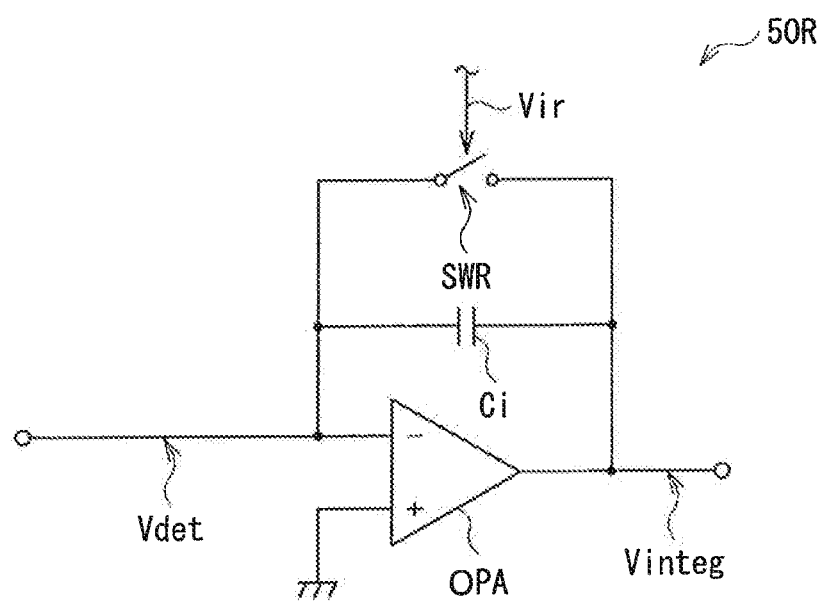
FIG. 14 is a circuit diagram illustrating a configuration example of an integration circuit according to a comparative example.

FIG. 14 illustrates a configuration example of an integration circuit 50R according to the comparative example. The integration circuit 50R according to the comparative example is similar to the integration circuit 50 (FIG. 6) according to the embodiment but without the read switch SWS. Thus, the integration circuit 50R is continuously connected to the touch detection electrode TDL and supplied with the touch detection signal Vdet.

In the following, operation of the display unit with a touch detection function 1R using the integration circuit 50R is described. For convenience of description, description is separately made on a case of indirect coupling only between the pixel signal line SGL and the touch detection electrode TDL and a case of direct coupling only therebetween.

Figure 15:
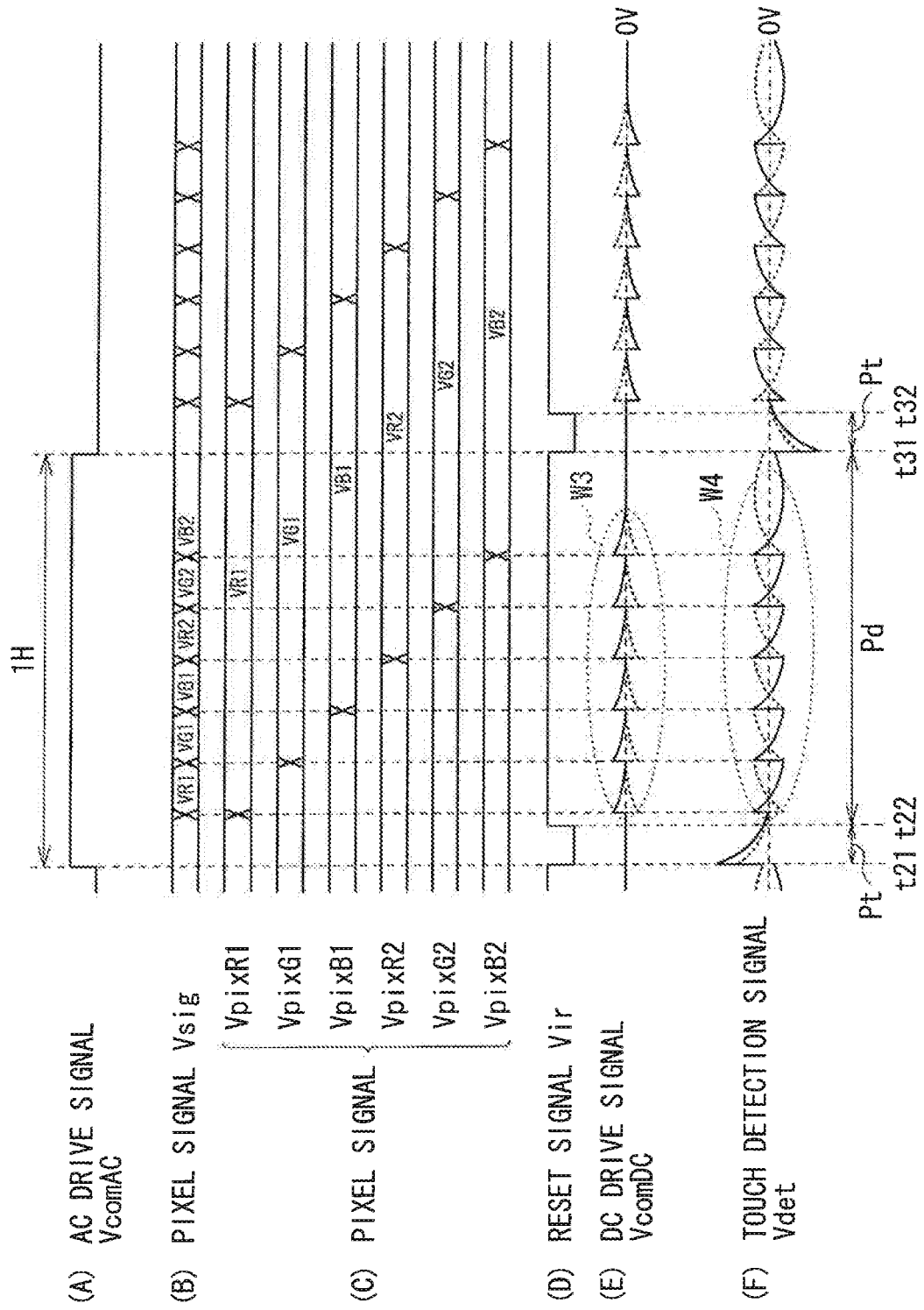
FIG. 15 is a timing waveform chart illustrating an operation example of a display unit with a touch detection function according to the comparative example.

FIG. 15 illustrates a timing waveform example of the display unit with a touch detection function 1R in the case of indirect coupling only, where (A) illustrates a waveform of an AC drive signal VcomAC, (B) illustrates a waveform of a pixel signal Vsig, (C) illustrates respective waveforms of pixel signals Vpix, (D) illustrates a waveform of a reset signal Vir, (E) illustrates a waveform of a DC drive signal VcomDC, and (F) illustrates a waveform of a touch detection signal Vdet.

Figure 16A:
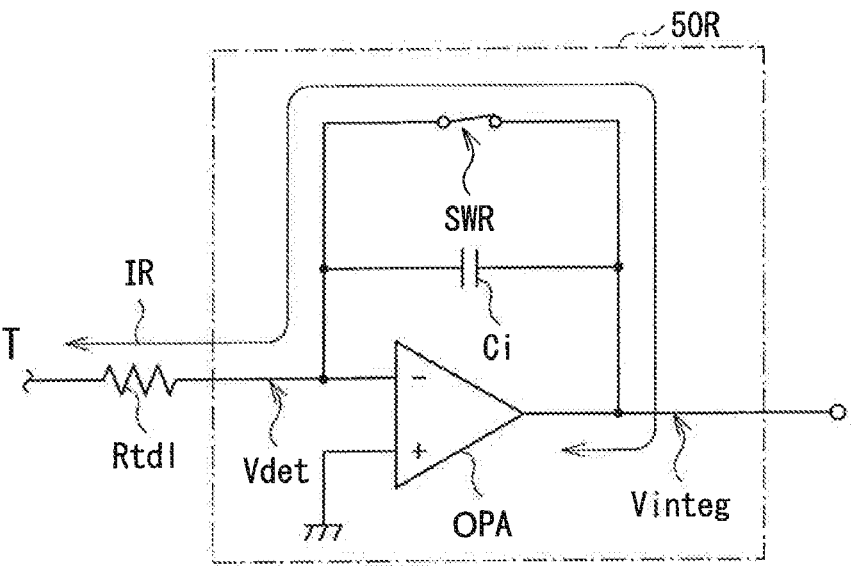
FIGS. 16A and 16B are circuit diagrams illustrating an operation example of an integration circuit according to the comparative example.
Figure 16B:
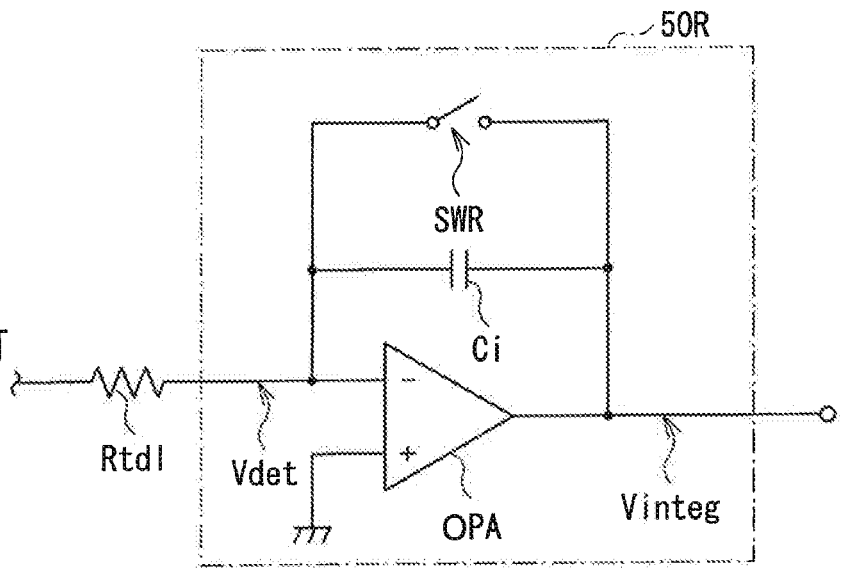

FIGS. 16A and 16B illustrate states of the integration circuit 50R, where FIG. 16A illustrates a state of the integration circuit 50R in a display period Pd (reset operation state), and FIG. 16B illustrates a state thereof in a touch detection period Pt (integration operation state). In the display period Pd, the reset signal Vir is in a high level as illustrated in (D) of FIG. 15, and the reset switch SWR is correspondingly in an on state (FIG. 16A), and the integration circuit 50R is thus in the reset operation state. In the touch detection period Pt, the reset signal Vir is in a low level, and the reset switch SWR is correspondingly in an off state (FIG. 16B), and the integration circuit 50R is thus in the integration operation state.

In the display unit with a touch detection function 1R, as illustrated in (F) of FIG. 15, noise is shown in the touch detection signal Vdet in the display period Pd due to indirect coupling between a pixel signal line SGL and a touch detection electrode TDL in a similar way to that in the embodiment. That is, first, a pixel signal Vpix is transmitted to a drive electrode COML through parasitic capacitance Cpd1 (FIG. 13A), and, for example, shown as noise in a DC drive signal VcomDC applied to the drive electrode COML (waveform W3 in (E) of FIG. 15). The noise is transmitted to the touch detection electrode TDL through parasitic capacitance Cpd2 (FIG. 13A), and thus shown as noise in the touch detection signal Vdet (waveform W4 in (F) of FIG. 15). Thus, noise in the touch detection signal Vdet caused by indirect coupling is due to the change in each of the plurality of pixel signals Vpix, which occurs in each display period Pd depending on the change in each of the plurality of pixel signals Vpix (VpixR1, VpixG1, VpixB1, VpixR2, VpixG2, and VpixB2).

Here, noise (waveform W4) shown in the touch detection signal Vdet has a similar waveform to noise (waveform W3) in the DC drive signal VcomDC. That is, noise voltage shown in the touch detection signal Vdet is changed based on the change in the pixel signal Vpix, and then gradually changed. During this, in the integration circuit 50R, an operational amplifier OPA operates such that positive input and negative input of the amplifier are virtually short-circuited to each other. That is, the operational amplifier OPA supplies a current IR to the touch detection electrode TDL to adjust the voltage of the negative input terminal, connected with the touch detection electrode TDL, of the operational amplifier OPA to be 0 V (FIG. 16A). As a result, the noise voltage shown in the touch detection signal Vdet is changed based on the change in the pixel signal Vpix, and then changed towards 0 V by the current IR and reversed in polarity after passing through 0 V, as illustrated in the waveform W4 in (F) of FIG. 15. Noise voltage of the touch detection signal Vdet in black display (solid line) and that in white display (dashed line) are reverse in polarity in respect to each other. Consequently, for example, a voltage level of the touch detection signal Vdet in black display (solid line) is different from that in white display (dashed line) at the end of the display period Pd.

When the display period Pd is finished, the touch detection signal Vdet is changed based on transition of the AC drive signal VcomAC at timing t31. Here, a waveform of the touch detection signal Vdet is also varied depending on display content due to a fact that the voltage level of the signal Vdet is varied depending on display content at the end of the display period Pd. Consequently, a result of integration of the touch detection signal Vdet in the touch detection period Pt is also varied depending on display content.

Figure 17:
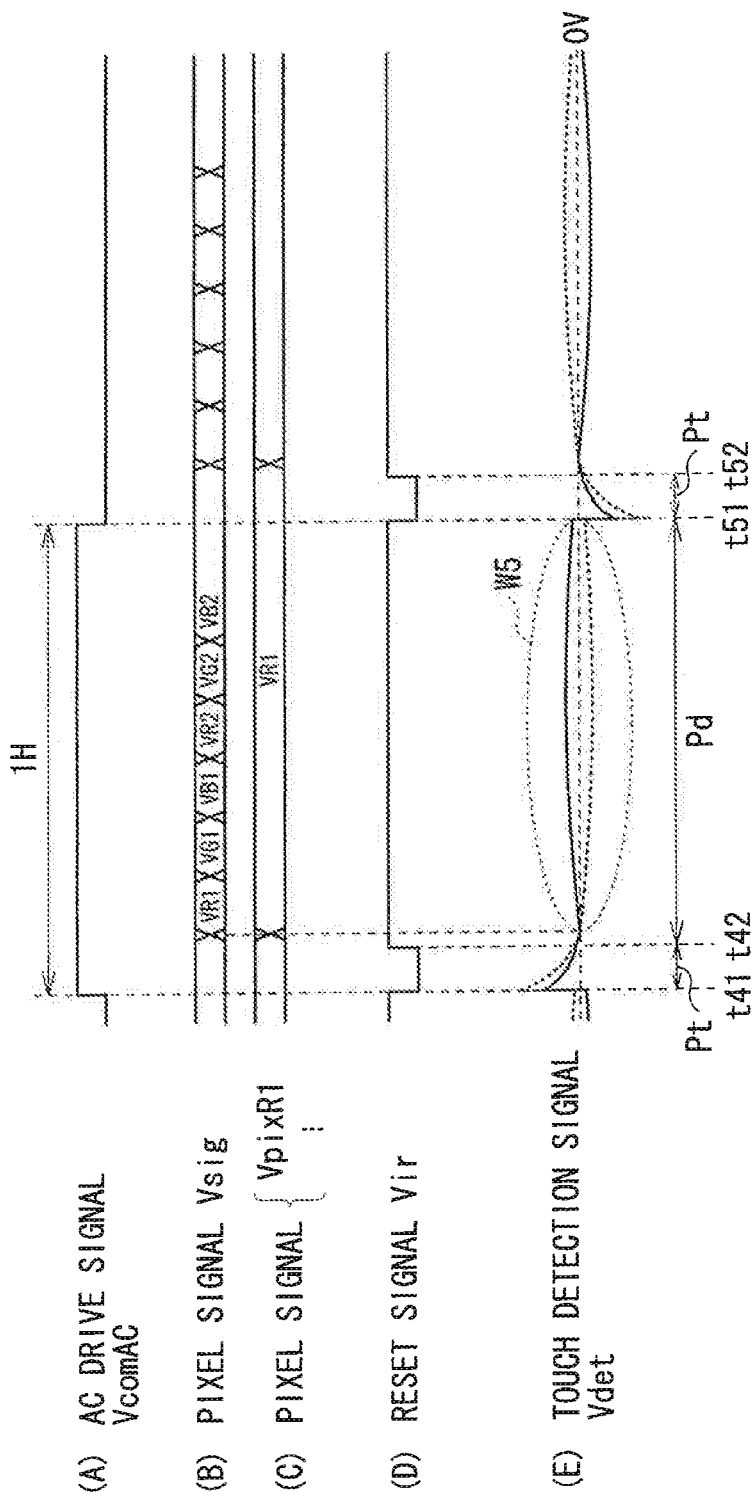
FIG. 17 is another timing waveform chart illustrating an operation example of the display unit with a touch detection function according to the comparative example.

FIG. 17 illustrates a timing waveform example of the display unit with a touch detection function 1R in the case of direct coupling only, where (A) illustrates a waveform of an AC drive signal VcomAC, (B) illustrates a waveform of a pixel signal Vsig, (C) illustrates a waveform of a pixel signal Vpix, (D) illustrates a waveform of a reset signal Vir, and (E) illustrates a waveform of a touch detection signal Vdet. This example shows a case that the pixel signal VpixR1 is shown as noise in the touch detection signal Vdet due to direct coupling.

In the display unit with a touch detection function 1R, as illustrated in (E) of FIG. 17, noise is shown in the touch detection signal Vdet in the display period Pd due to direct coupling between the pixel signal line SGL and the touch detection electrode TDL in a similar way to that in the embodiment. That is, in this example, the pixel signal VpixR1 is transmitted to the touch detection electrode TDL through parasitic capacitance Cpi (FIG. 13B), and thus shown as noise in the touch detection signal Vdet (waveform W5 in (E) of FIG. 17). That is, in this example, noise in the touch detection signal Vdet due to the direct coupling is caused by a fact that a pixel signal VpixR1 is changed every one horizontal period, and occurs in correspondence to the change in approximately one pixel signal Vpix (pixel signal VpixR1 in the example) in each display period Pd.

Even in this case, for example, a voltage level of the touch detection signal Vdet in black display (solid line) is different from that in white display (dashed line) at the end of the display period Pd. Consequently, a result of integration of the touch detection signal Vdet in the touch detection period Pt following the display period Pd is varied depending on display content.

In this way, in the display unit with a touch detection function 1R according to the comparative example, in either case of considering direct coupling or considering indirect coupling between the pixel signal line SGL and the touch detection electrode TDL, the voltage level of the touch detection signal Vdet is varied depending on display content immediately before the touch detection period Pt. As a result, a result of integration of the touch detection signal Vdet in the touch detection period Pt is also varied depending on display content. In other words, an S/N ratio of the touch detection signal Vdet may be degraded due to display. The display unit with a touch detection function 1R may therefore be degraded in touch position accuracy or the like.

In contrast, in the display unit with a touch detection function 1 according to the embodiment, in either case of considering direct coupling or considering indirect coupling, the voltage level of the touch detection signal Vdet is constant regardless of display content immediately before the touch detection period Pt. That is, in the display unit with a touch detection function 1, the read switch SWS is turned on immediately before the touch detection period Pt, thereby the virtual short-circuit voltage (0 V) of the negative input terminal of the operational amplifier OPA is applied to the touch detection electrode TDL, and therefore voltage of the touch detection signal Vdet is 0 V regardless of display content ((H) of FIG. 11). Accordingly, a result of integration of the touch detection signal Vdet in the touch detection period Pt may not be affected by display content.

[Effects]

As described above, in the embodiment, the voltage of the pixel signal line SGL is prevented from being changed in the touch detection period, which makes it possible to suppress the change in the touch detection signal caused by the changes in the pixel signals, and thus influence of display operation on touch detection may be suppressed.

In the embodiment, a read switch is provided and turned on immediately before the touch detection period, which makes it possible to set the voltage of the touch detection signal Vdet to 0 V regardless of display content, and thus influence of display operation on touch detection may be suppressed.

Modification 1

While the source driver 13 applies the pixel signals Vpix to the pixel signal lines SGL via the selection switch section 14 in the embodiment, this is not limitative. Instead, for example, the source driver 13 may directly apply the pixel signals Vpix to the pixel signal lines SGL after generating the signals. In other words, while each pixel signal line SGL is made to be in a floating state to maintain the voltage of the pixel signal line SGL during the touch detection period in the embodiment, this is not limitative. Instead, for example, a voltage may be directly applied to each pixel signal line SGL to maintain the voltage of the pixel signal line SGL during the touch detection period.

3. Second Embodiment

Next, a display unit with a touch detection function 7 according to a second embodiment of the disclosure is described. In the embodiment, a predetermined voltage is applied to each pixel signal line SGL during a touch detection period Pt. It is to be noted that substantially the same components as those of the display unit with a touch detection function 1 according to the above-described first embodiment are designated by the same numerals, and description of them is appropriately omitted.

The display unit with a touch detection function 7 includes a source driver 13A and a detection timing control section 46A as illustrated in FIG. 4.

The source driver 13A generates a pixel signal Vsig including a predetermined voltage Vp (described later), and generates a switch control signal Vsel necessary for demultiplexing pixel signals Vpix multiplexed into the pixel signal Vsig and separating the predetermined voltage Vp, and supplies the switch control signal Vsel together with the pixel signal Vsig to a selection switch section 14. The predetermined voltage Vp is applied to all pixel signal lines SGL in all touch detection periods Pt and all periods before and after the respective touch detection periods.

The detection timing control section 46A is similar to the detection timing control section 46 according to the above-described first embodiment, but generates a read signal Vis2 (described later) in place of the read signal Vis and supplies the signal to an integration section 42.

Figure 18:
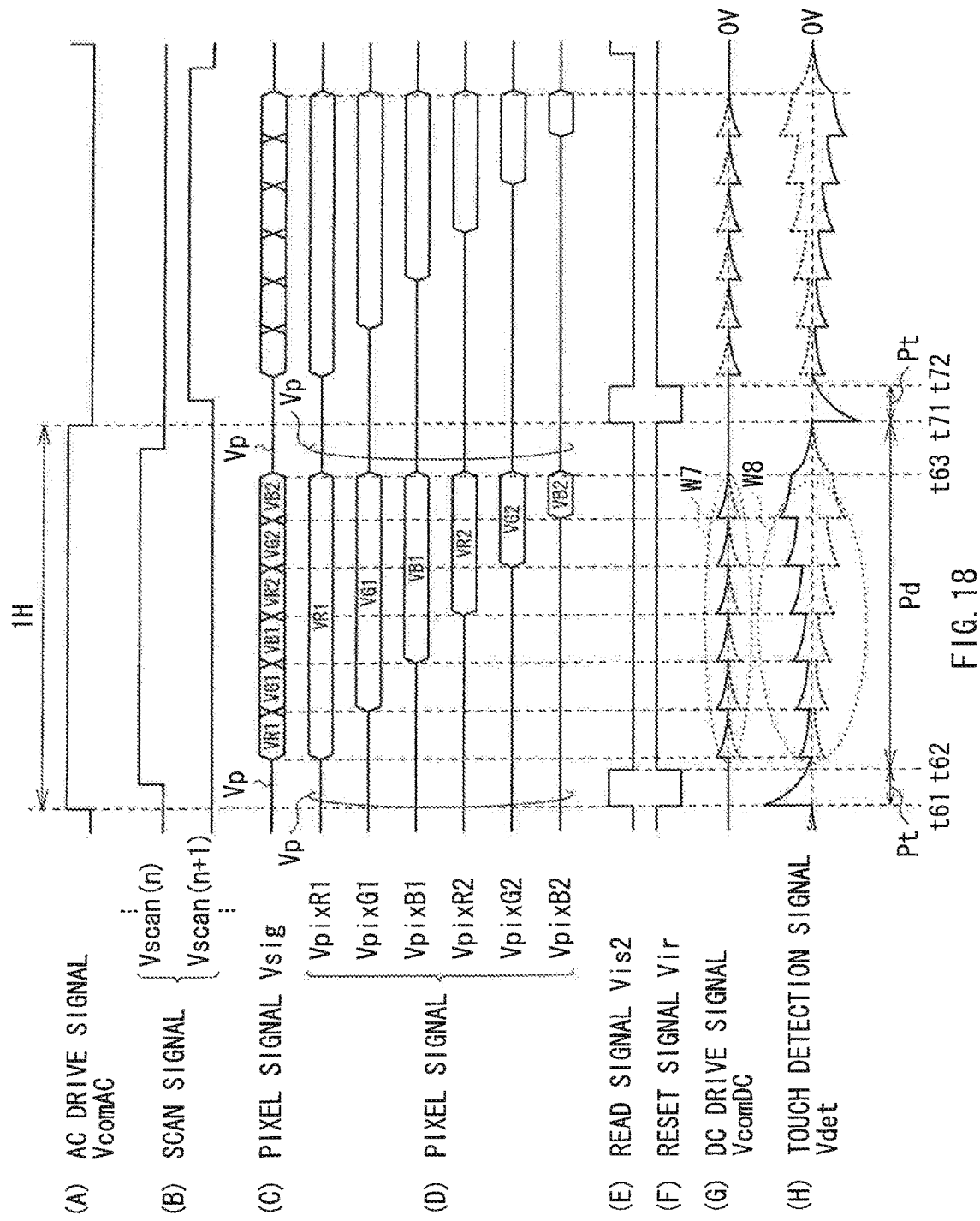
FIG. 18 is a timing waveform chart illustrating an operation example of a display unit with a touch detection function according to a second embodiment.

FIG. 18 illustrates a timing waveform example of the display unit with a touch detection function 7, where (A) illustrates a waveform of an AC drive signal VcomAC, (B) illustrates a waveform of a scan signal Vscan, (C) illustrates a waveform of the pixel signal Vsig, (D) illustrates respective waveforms of the pixel signals Vpix, (E) illustrates a waveform of a read signal Vis2, (F) illustrates a waveform of a reset signal Vir, (G) illustrates a waveform of a DC drive signal VcomDC, and (H) illustrates a waveform of a touch detection signal Vdet.

In the display unit with a touch detection function 7, at timing t63, the source driver 13A outputs a predetermined voltage Vp as the pixel signal Vsig ((C) of FIG. 18), and the selection switch section 14 simultaneously turns on all switches SR1, SG1, SB1, SR2, SG2, and SB2 of a switch group 17 and thus applies the predetermined voltage Vp to all the pixel signal lines SGL ((D) of FIG. 18). At timing t71, an integration circuit 50 is turned into an integration operation state based on the read signal Vis2 and the reset signal Vir generated by the detection timing control section 46A, and integrates the touch detection signal Vdet.

During this, in the display unit with a touch detection function 7, noise is shown in the touch detection signal Vdet in a display period Pd (waveform W8 in (H) of FIG. 18) as in the above-described first embodiment (FIG. 11). The noise is due to both direct and indirect coupling between the pixel signal line SGL and a touch detection electrode TDL. When the voltage of the pixel signal line SGL is set to the predetermined voltage Vp at timing t63, the voltage shift of the touch detection signal Vdet due to direct coupling between the pixel signal line SGL and the touch detection electrode TDL may be returned. Consequently, the touch detection signal Vdet converges towards a certain voltage, 0 V, regardless of display content.

As described above, in the embodiment, the predetermined voltage Vp is applied to the pixel signal lines SGL in the touch detection period Pt, which makes it possible to reduce influence of direct coupling between the pixel signal line and the touch detection electrode, and thus influence of display on touch detection may be suppressed. Other effects are similar to those in the above-described first embodiment.

4. Third Embodiment

Next, a display unit with a touch detection function 8 according to a third embodiment of the disclosure is described. In the embodiment, display operation is performed by dot inversion driving, and pixel signals are supplied in two separate times. It is to be noted that substantially the same components as those of the display unit with a touch detection function 1 according to the first embodiment are designated by the same numerals, and description of them is appropriately omitted.

The display unit with a touch detection function 8 includes a source driver 13B, a selection switch section 14B, and a drive electrode driver 16B as illustrated in FIG. 4.

The source driver 13B generates a pixel signal Vsig for applying a pixel signal Vpix to each pixel signal line SGL in two separate times, and generates switch control signals Vsel (VselR, VselG, and VselB) necessary for demultiplexing pixel signals Vpix multiplexed into the pixel signal Vsig, and supplies the switch control signals Vsel together with the pixel signal Vsig to a selection switch section 14B, as described later.

The selection switch section 14B demultiplexes the pixel signals Vpix, which have been time-divisionally-multiplexed into the pixel signal Vsig, based on the pixel signal Vsig and the switch control signals Vsel supplied from the source driver 13, and supplies the pixel signals Vpix to a liquid crystal display device 20 of a display device with a touch detection function 10.

Figure 19:
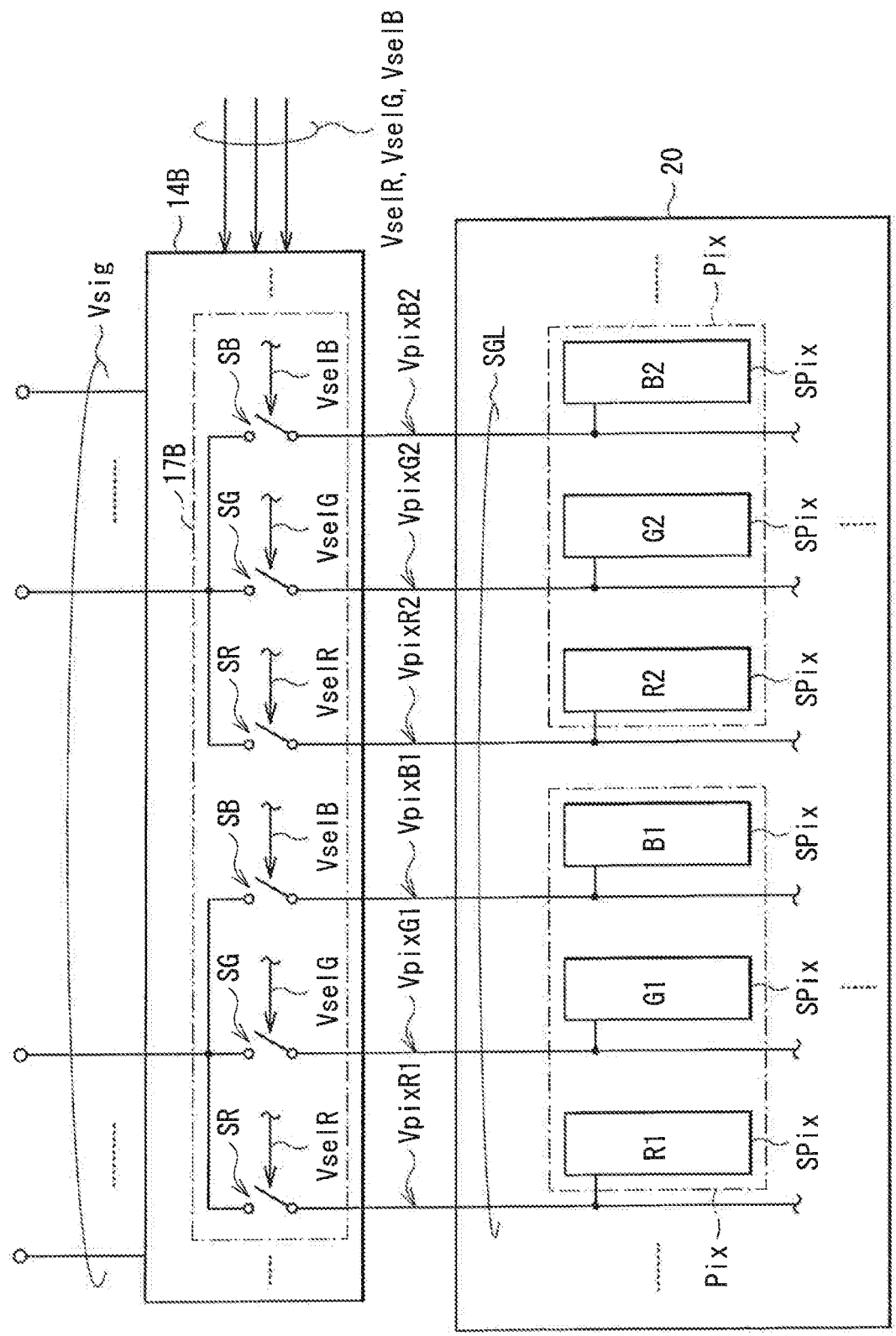
FIG. 19 is a block diagram illustrating a configuration example of a selection switch section according to a third embodiment.

FIG. 19 illustrates a configuration example of the selection switch section 14B. The selection switch section 14B has a plurality of switch groups 17B. Each switch group 17B includes three switches SR, SG, and SB, where respective one ends of the switches are connected to one another and supplied with a pixel signal Vsig from the source driver 13B, and respective the other ends thereof are connected to three sub pixels SPix through pixel signal lines SGL of the liquid crystal display device 20 of the display device with a touch detection function 10. The respective three switches SR, SG, and SB are controlled to be on or off by the switch control signals Vsel (VselR, VselG, and VselB) supplied from the source driver 13B.

As illustrated in FIG. 19, pixel signals VpixR1, VpixG1, and VpixB1 are supplied to a particular pixel Pix by the selection switch section 14B, and pixel signals VpixR2, VpixG2, and VpixB2 are supplied to another pixel Pix adjacent to the particular pixel Pix in the same row.

In touch detection operation, the drive electrode driver 16B applies an AC drive signal VcomAC as a touch detection drive signal Vcomt to a plurality of drive electrodes COML participating in the touch detection operation. In addition, the drive electrode driver 16B applies a DC drive signal VcomDC to drive electrodes COML other than the drive electrodes COML applied with the AC drive signal VcomAC. That is, the drive electrode driver 16B applies the DC drive signal VcomDC to drive electrodes COML participating in display operation.

Figures 20A, 20B:
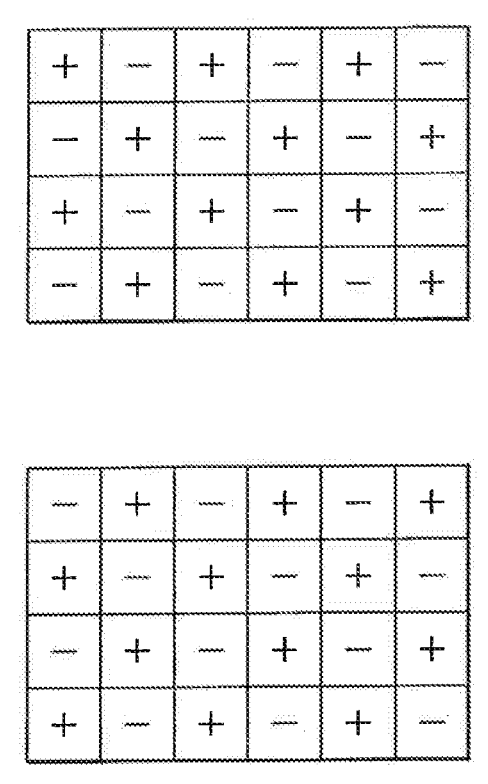

FIGS. 20A and 20B schematically illustrate dot inversion driving, where FIG. 20A illustrates polarity of each of pixel signals Vpix for sub pixels SPix in a frame, and FIG. 20B illustrates polarity of each of pixel signals Vpix in a subsequent frame. As illustrated in FIGS. 20A and 20B, the dot inversion driving is performed such that pixel signals Vpix for adjacent sub pixels SPix are different in polarity from each other in a particular frame. Furthermore, polarity of each of pixel signals Vpix for all sub pixels SPix in a particular frame is reversed every one frame. In the dot inversion driving, the source driver 13B and the selection switch section 14B apply pixel signals Vpix reverse in polarity to each other to adjacent pixel signal lines SGL.

Figure 21:
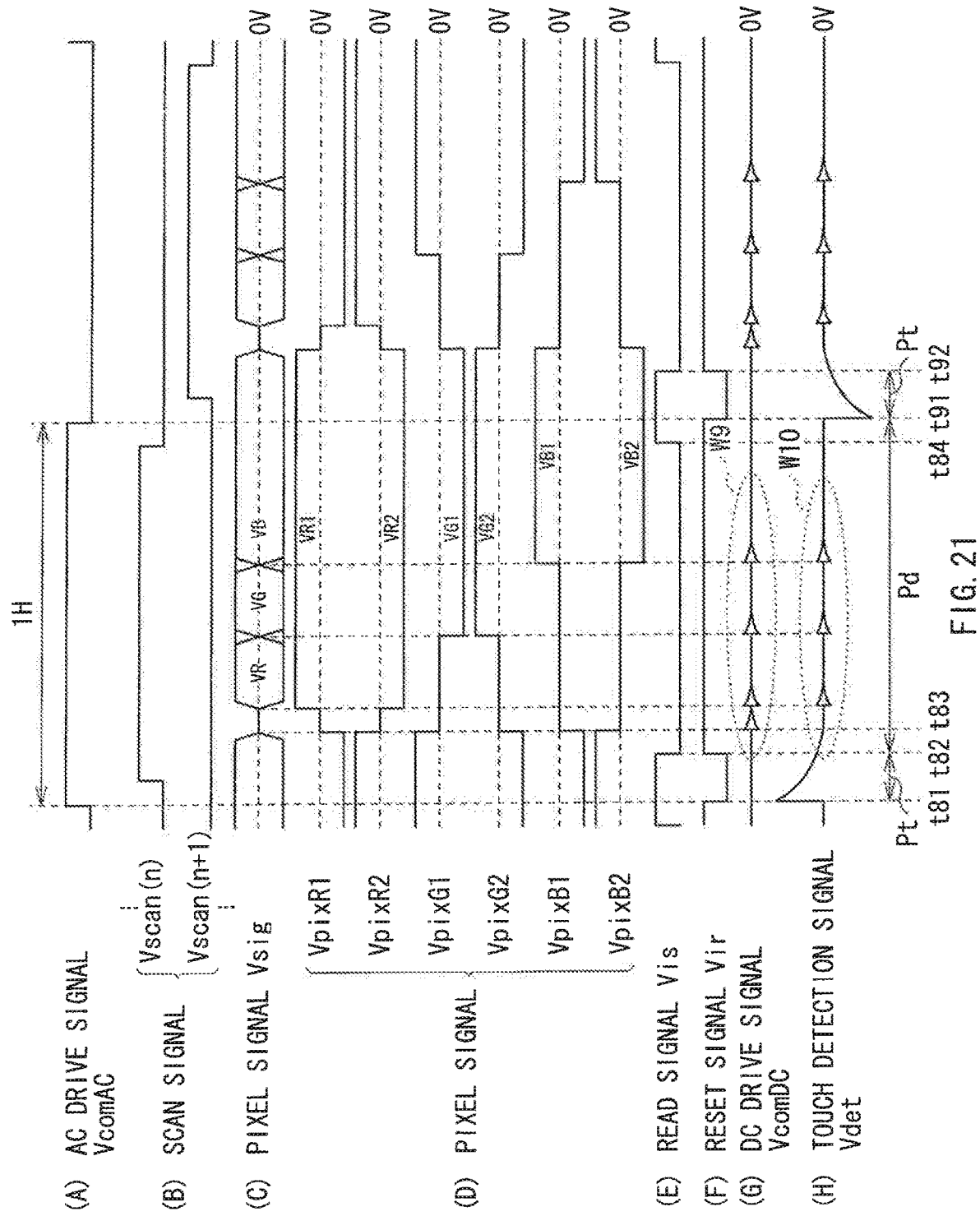
FIG. 21 is a timing waveform chart illustrating an operation example of the display unit with a touch detection function according to the third embodiment.

FIG. 21 illustrates a timing waveform example of the display unit with a touch detection function 8, where (A) illustrates a waveform of the AC drive signal VcomAC, (B) illustrates a waveform of a scan signal Vscan, (C) illustrates a waveform of the pixel signal Vsig, (D) illustrates respective waveforms of the pixel signals Vpix, (E) illustrates a waveform of a read signal Vis, (F) illustrates a waveform of a reset signal Vir, (G) illustrates a waveform of the DC drive signal VcomDC, and (H) illustrates a waveform of a touch detection signal Vdet. In (D) of FIG. 21, the pixel signals Vpix indicate pixel signals Vpix (VpixR1, VpixG1, and VpixB1) for a particular pixel Pix and pixel signals Vpix (VpixR2, VpixG2, and VpixB2) for another pixel Pix adjacent to the particular pixel Pix.

First, at timing t81, the drive electrode driver 16B applies the AC drive signal VcomAC as a touch detection drive signal Vcomt to drive electrodes COML participating in touch detection operation. The touch detection drive signal Vcomt is transmitted to each of touch detection electrodes TDL through capacitance between the drive electrode COML and the touch detection electrode TDL, causing a change in the touch detection signal Vdet ((H) of FIG. 21).

Next, the gate driver 12 applies a scan signal Vscan(n) to a scan signal line GCL(n) in the nth row, and the scan signal Vscan(n) is changed from a low level to a high level ((B) of FIG. 21).

Next, at timing t82, the detection timing control section 46 changes the read signal Vis from a high level to a low level, and concurrently changes the reset signal Vir from a low level to a high level ((E) and (F) of FIG. 21), so that an integration circuit 50 is turned into a reset operation state.

Next, at timing t83, the source driver 13B and the selection switch section 14B apply 0 V to the pixel signal lines SGL. Specifically, the source driver 13B outputs a voltage of 0 V as a pixel signal Vsig ((C) of FIG. 21), and supplies switch control signals Vsel (VselR, VselG, and VselB) allowing the three switches SR, SG, and SB of the switch group 17B to be on at the same time. The selection switch section 14B applies the voltage of 0 V as pixel signals Vpix to all the pixel signal lines SGL based on the pixel signal Vsig and the switch control signals Vsel ((D) of FIG. 21). Then, the source driver 13B and the selection switch section 14B sequentially apply the pixel signals Vpix to the pixel signal lines SGL ((D) of FIG. 21) for display corresponding to one horizontal line.

Here, each pixel signal Vpix is transmitted to the touch detection electrode TDL through direct and indirect coupling between the pixel signal line SGL and the touch detection electrode TDL, and shown as noise in the touch detection signal Vdet (waveform W10 in (H) of FIG. 21). However, the dot inversion driving may drastically reduce noise particularly caused by indirect coupling out of the direct and indirect coupling. That is, generally, adjacent same-color sub-pixels SPix, for example, R1 and R2 in FIG. 19, often have approximately the same luminance. In the dot inversion driving (FIGS. 20A and 20B), respective pixel signals Vpix reverse in polarity are applied to the adjacent same-color sub-pixels SPix. Specifically, for example, pixel signals VpixR1 and VpixR2 are typically reverse in polarity ((D) of FIG. 21). When the pixel signals VpixR1 and VpixR2 are transmitted to the same drive electrode COML through parasitic capacitance Cpd1 (FIG. 13A), the signals are canceled by each other, so that noise is hardly shown in a DC drive signal VcomDC of the drive electrode COML ((G) of FIG. 21). Consequently, noise is hardly shown in the touch detection signal Vdet from the touch detection electrode TDL either ((H) of FIG. 21).

Next, at timing t84, the detection timing control section 46 changes the read signal Vis from a low level to a high level ((E) of FIG. 21), and thus a virtual short-circuit voltage (0 V) of a negative-input terminal of an operational amplifier OPA is applied to the touch detection electrode TDL ((H) of FIG. 21).

Next, at timing t91, the drive electrode driver 16B applies the AC drive signal VcomAC as a touch detection signal Vcomt to each of drive electrodes COML participating in touch detection operation. The touch detection signal Vcomt is transmitted to the touch detection electrode TDL through capacitance between the drive electrode COML and the touch detection electrode TDL, causing a change in the touch detection signal Vdet ((H) of FIG. 21). In addition, an integration circuit 50 integrates the touch detection signal Vdet in a period from timing t91 to timing t92 (touch detection period Pt), and touch detection is thus performed.

After that, the above-described operation is repeated, thereby the display unit with a touch detection function 8 performs display operation through scan of the whole display surface, and performs touch detection operation through scan of the whole touch detection surface.

In the display unit with a touch detection function 8, display operation is performed using dot inversion driving, making it possible to reduce noise in the touch detection signal Vdet due to coupling between the pixel signal line SGL and the touch detection electrode TDL. That is, degradation in S/N ratio of the touch detection signal Vdet due to display may be suppressed.

As illustrated in FIG. 21, the source driver 13B and the selection switch section 14B temporarily apply 0 V to the pixel signal lines SGL at timing t83, and then apply desired pixel signals Vpix thereto. That is, in the display unit with a touch detection function 8, the pixel signals Vpix are applied in two separate times. This is effective, and such an effect is described below in comparison with a case of applying the pixel signals Vpix in one time.

Figure 22:
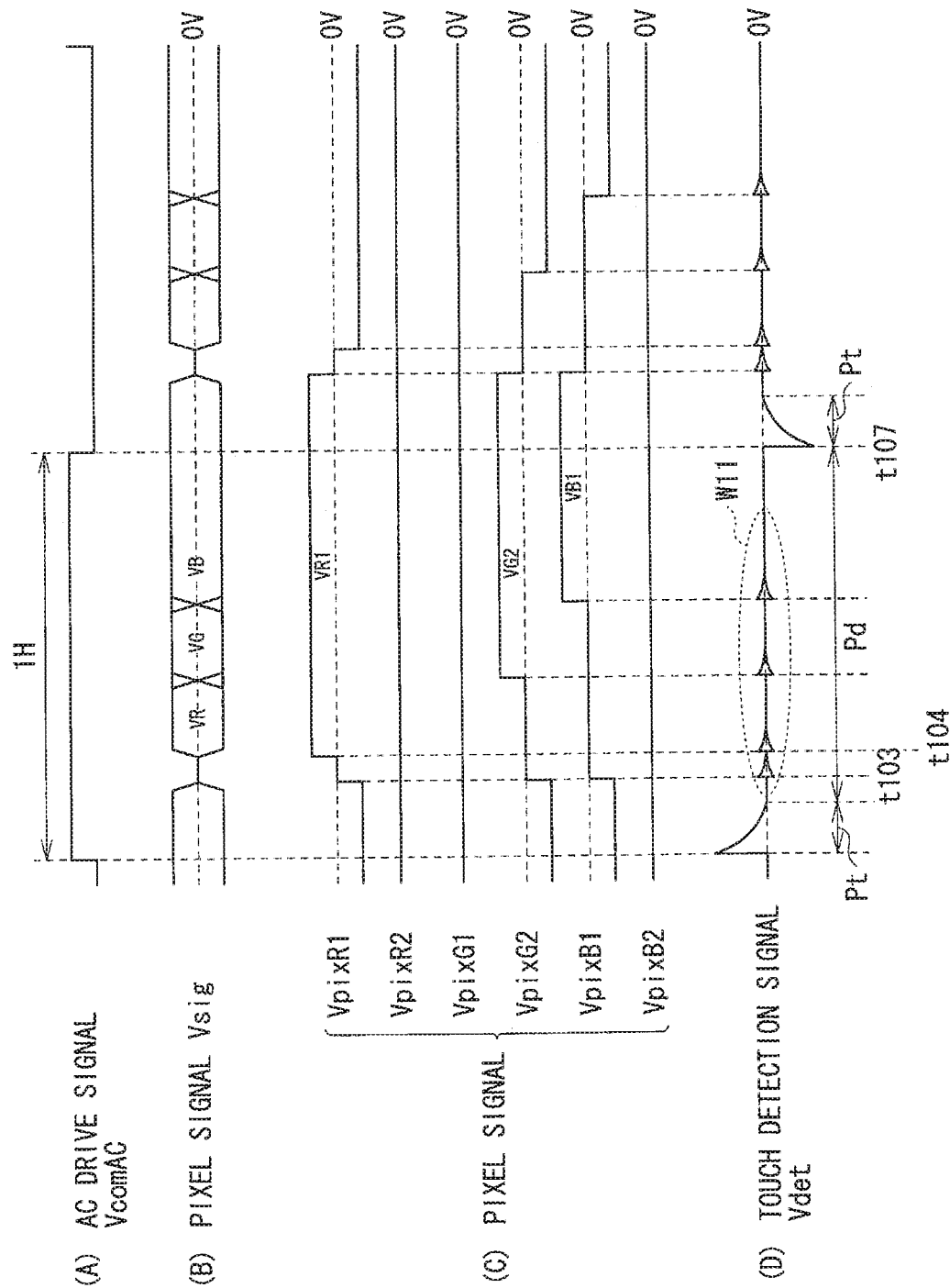
FIG. 22 is a timing waveform chart illustrating another operation example of the display apparatus with a touch detection function according to the third embodiment.

FIG. 22 illustrates another timing waveform example of the display unit with a touch detection function 8, where (A) illustrates a waveform of the AC drive signal VcomAC, (B) illustrates a waveform of the pixel signal Vsig, (C) illustrates respective waveforms of the pixel signals Vpix, and (D) illustrates a waveform of the touch detection signal Vdet. This waveform example is made assuming the worst case that noise caused by display is most significantly shown in the touch detection signal Vdet in the dot inversion driving.

Figure 23:
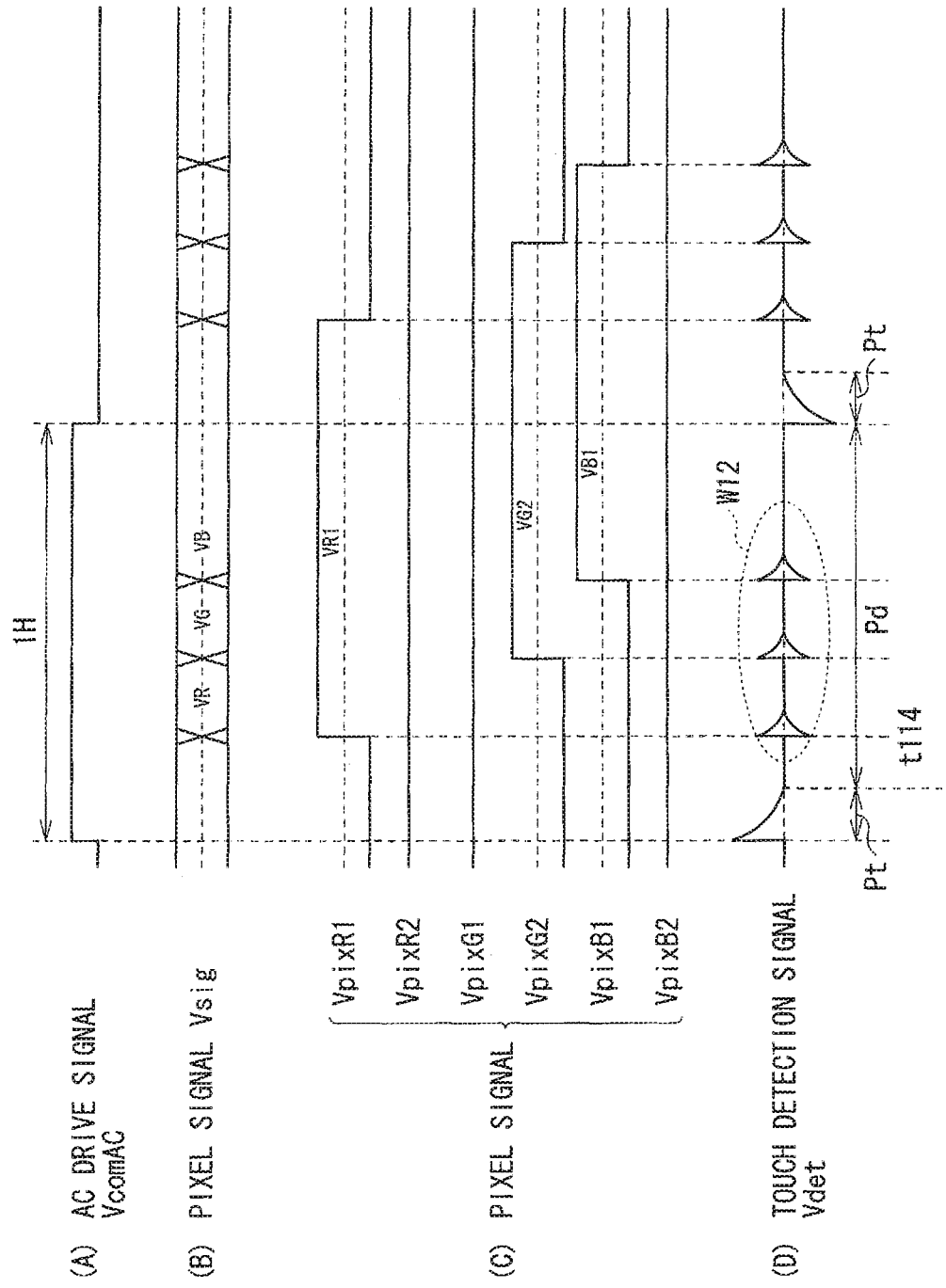
FIG. 23 is a timing waveform chart illustrating an operation example of a display unit with a touch detection function according to a comparative example.

FIG. 23 illustrates a timing waveform example in the case that the pixel signals Vpix are applied in one time, where (A) illustrates a waveform of the AC drive signal VcomAC, (B) illustrates a waveform of the pixel signal Vsig, (C) illustrates respective waveforms of the pixel signals Vpix, and (D) illustrates a waveform of the touch detection signal Vdet.

In this example of the display unit with a touch detection function 8 according to the embodiment, while a large pixel signal Vpix is applied to one of adjacent same-color sub-pixels SPix, 0 V is applied to the other, as illustrated in (C) of FIG. 22. Specifically, for example, while a voltage VR1 is applied to a red sub-pixel SPix (R1), a voltage VR2 of 0 V is applied to a sub-pixel SPix (R2) adjacent to the sub-pixel SPix (R1), as illustrated in pixel signals VpixR1 and VpixR2 in (C) of FIG. 22. Accordingly, when the pixel signals VpixR1 and VpixR2 are transmitted to the same drive electrode COML through parasitic capacitance Cpd1 (FIG. 13A), the signals are hardly canceled by each other unlike the case illustrated in FIG. 21. Eventually, noise is shown in the touch detection signal Vdet from the touch detection electrode TDL. Similarly, while a voltage VG2 is applied to a green sub-pixel SPix (G2), a voltage VG1 of 0 V is applied to a sub-pixel SPix (G1) adjacent to the sub-pixel SPix (G2), as illustrated in pixel signals VpixG1 and VpixG2 in (C) of FIG. 22; and while a voltage VB1 is applied to a blue sub-pixel SPix (B1), a voltage VB2 of 0 V is applied to a sub-pixel SPix (B2) adjacent to the sub-pixel SPix (B1), as illustrated in pixel signals VpixB1 and VpixB2 of FIG. 22.

However, in the display unit with a touch detection function 8, pixel signals Vpix are applied in two separate times, making it possible to reduce the change in each pixel signal Vpix. For example, as illustrated in FIG. 22, since the pixel signal VpixR1 becomes 0 V at timing t103 and then changed into the voltage VR1 at timing t104, the change in the pixel signal VpixR1 is small compared with a case that the pixel signal VpixR1 is changed into the voltage VR1 only at timing t114 (FIG. 23). The display unit with a touch detection function 8 may therefore reduce noise (waveform W11) shown in the touch detection signal Vdet, as illustrated in FIG. 22. It is to be noted that in the display unit with a touch detection function 8, since pixel signals Vpix are applied in two separate times as illustrated in FIG. 22, noise is shown in the touch detection signal Vdet also at timing t103. However, since there is enough time before timing t107, namely, before start of the touch detection period Pt, integration operation can be less affected by the noise in the touch detection period Pt, making it possible to suppress influence of the noise on touch detection.

As described above, the embodiment uses the dot inversion driving, in which the pixel signals are applied in two separate times, making it possible to suppress influence of display on touch detection. Other effects are similar to those in the first and second embodiments described above.

5. Application Examples

Next, application examples of the display apparatus with a touch detection function described above in the embodiments and the modification are described with reference to FIGS. 24 to 28G. The display unit with a touch detection function described in each of the embodiments and the like described above may be applicable to electronic units in various fields, including a television apparatus, a digital camera, a notebook personal computer, a mobile terminal device such as a mobile phone, and a video camera. In other words, the display device with a touch detection function described above in the embodiments and the like may be applicable to electronic units in various fields for displaying externally-input or internally-generated video signals as still or video images.

Application Example 1

Figure 24:
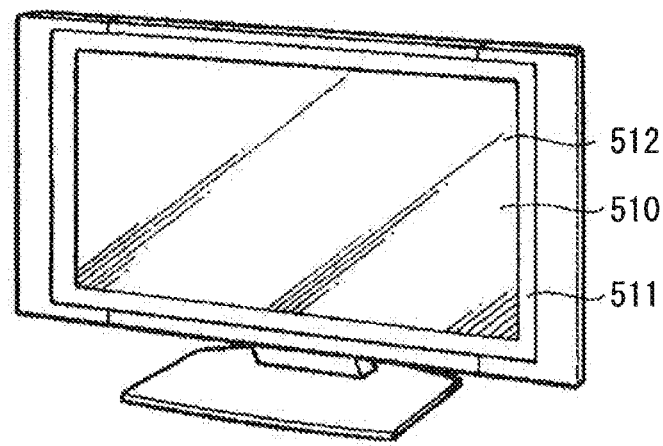
FIG. 24 is a perspective diagram illustrating an appearance configuration of an application example 1, out of display units with a touch detection function applied with the embodiments.

FIG. 24 shows appearance of a television apparatus applied with the display unit with a touch detection function according to the embodiments and the like described above.

The television apparatus has, for example, an image display screen section 510 including a front panel 511 and filter glass 512, and the image display screen section 510 is configured of the display unit with a touch detection function according to each of the embodiments and the like described above.

Application Example 2

Figure 25A:
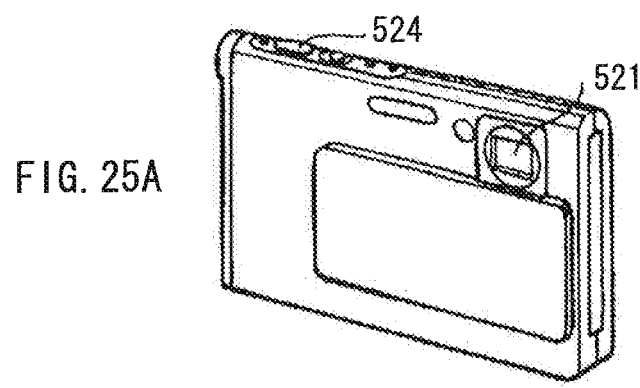
FIGS. 25A and 25B are perspective diagrams illustrating an appearance configuration of an application example 2.
Figure 25B:
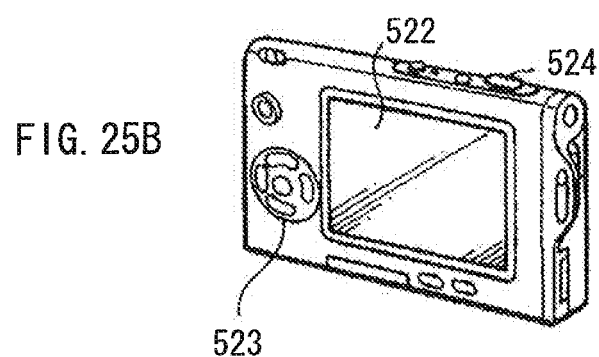

FIGS. 25A and 25B show appearance of a digital camera applied with the display unit with a touch detection function according to the embodiments and the like described above. The digital camera has, for example, a light emitting section for flash 521, a display section 522, a menu switch 523, and a shutter button 524, and the display section 522 is configured of the display unit with a touch detection function according to the embodiments and the like described above.

Application Example 3

Figure 26:
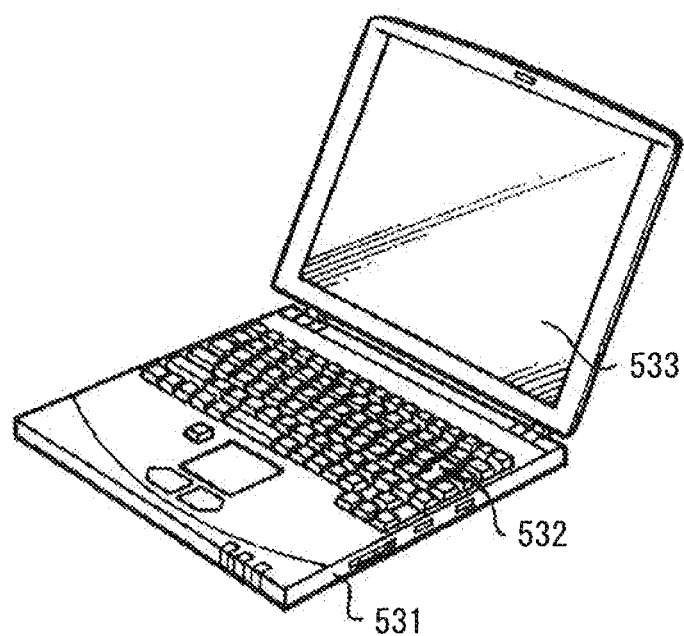
FIG. 26 is a perspective diagram illustrating an appearance configuration of an application example 3.

FIG. 26 shows appearance of a notebook personal computer applied with the display unit with a touch detection function according to the embodiments and the like described above. The notebook personal computer has, for example, a main body 531, a keyboard 532 for input operation of letters and the like, and a display section 533 for displaying images, and the display section 533 is configured of the display unit with a touch detection function according to the embodiments and the like described above.

Application Example 4

Figure 27:
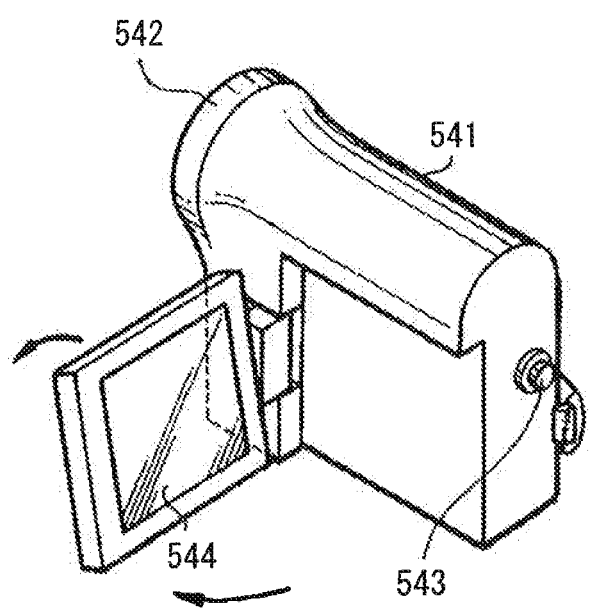
FIG. 27 is a perspective diagram illustrating an appearance configuration of an application example 4.
Figure 28:
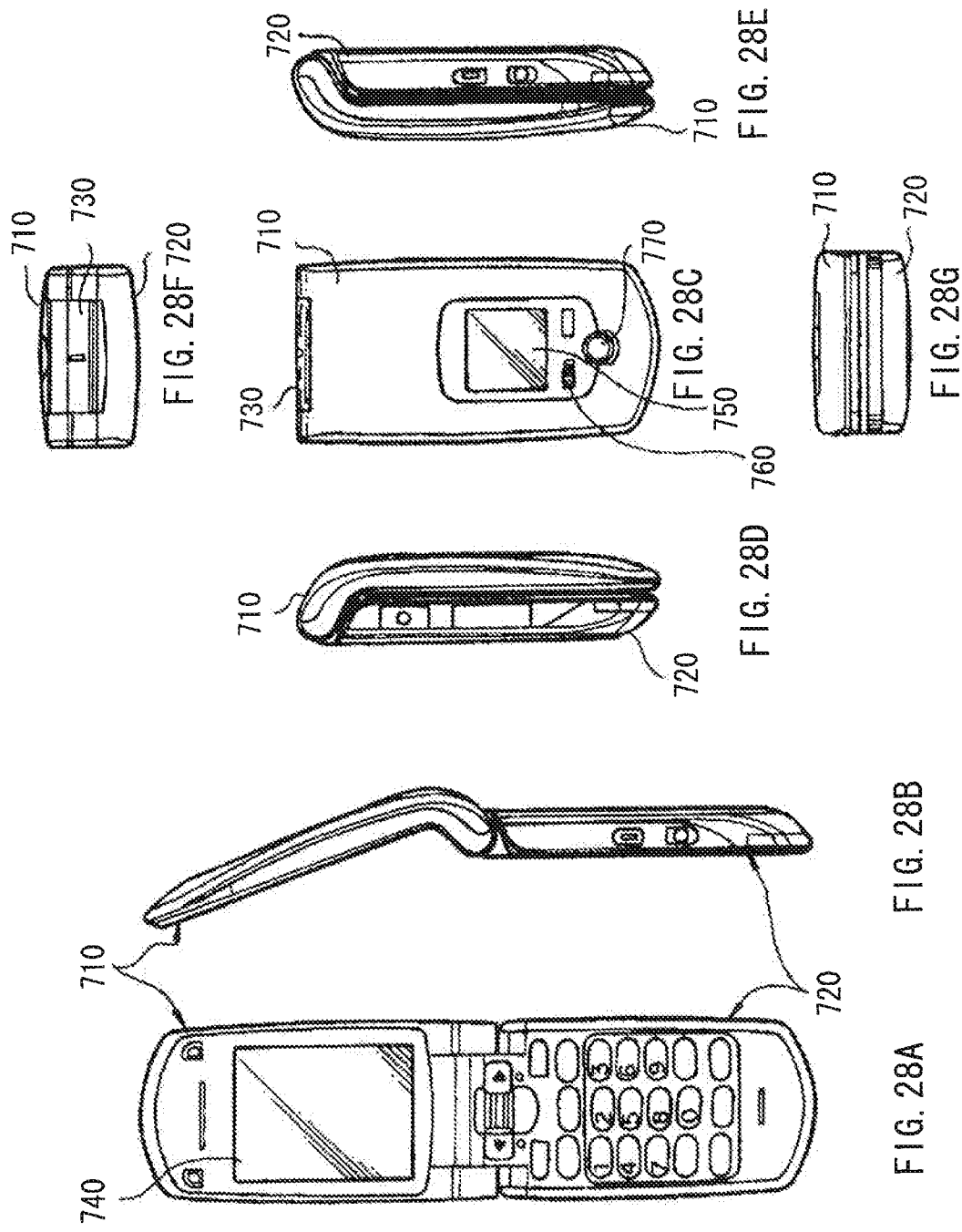
FIGS. 28A to 28G are front diagrams, side diagrams, a top diagram, and a bottom diagram illustrating an appearance configuration of an application example 5.

FIG. 27 shows appearance of a video camera applied with the display unit with a touch detection function according to the embodiments and the like described above. The video camera has, for example, a main body section 541, an object-shooting lens 542 provided on a front side face of the main body section 541, a start/stop switch 543 for shooting, and a display section 544. The display section 544 is configured of the display unit with a touch detection function according to each of the embodiments and the like described above.

Application Example 5

FIGS. 28A to 28G show appearance of a mobile phone applied with the display unit with a touch detection function according to each of the embodiments and the like described above. For example, the mobile phone is configured of an upper housing 710 and a lower housing 720 connected to each other by a hinge section 730, and has a display 740, a sub display 750, a picture light 760, and a camera 770. The display 740 or the sub display 750 is configured of the display unit with a touch detection function according to the embodiments and the like described above.

While the disclosure has been described with the several embodiments, the modification, and the application examples to electronic units hereinbefore, the disclosure is not limited to the embodiments and the like, and various modifications or alterations may be made.

Figure 29:
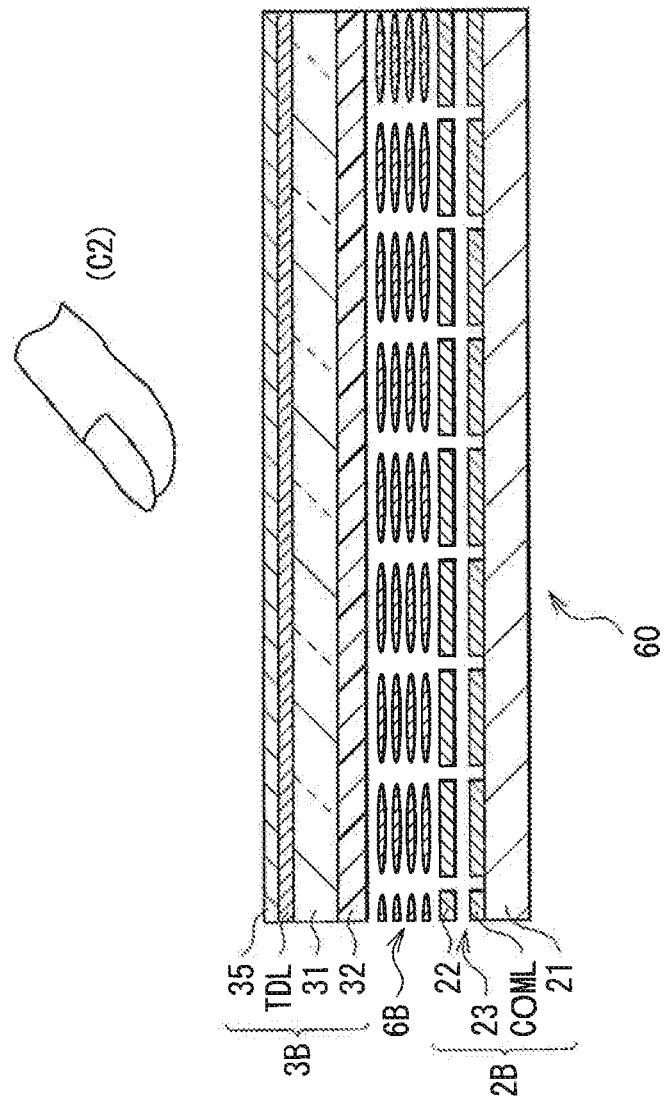

For example, while the liquid crystal display device 20 using various modes of liquid crystal, including TN, VA, and ECB, is integrated with the touch detection device 30 to configure the display device 10 in the above-described embodiments and the like, a liquid crystal display device using liquid crystal of a transverse electric mode such as FFS (Fringe Field Switching) and IPS (In-Plane Switching) may be integrated with a touch detection device instead. For example, when liquid crystal of the transverse electric mode is used, a display device with a touch detection function 60 may be configured as illustrated in FIG. 29. FIG. 29 illustrates an example of a relevant-part section structure of the display device with a touch detection function 60, showing a condition that a liquid crystal layer 6B is sandwiched between a pixel substrate 2B and a counter substrate 3B. Since names or functions of other sections are similar to those in the case of FIG. 7, description of them is omitted. In this example, unlike in the case of FIG. 7, drive electrodes COML used for both display and touch detection are formed closely above a TFT substrate 21 so as to configure part of a pixel substrate 2B. Pixel electrodes 22 are disposed above the drive electrodes COML with an insulating layer 23 in between. In this case, all dielectrics between the drive electrodes COML and touch detection electrodes TDL including the liquid crystal layer 6B contribute to formation of capacitance C1.

For example, while a so-called in-cell type, where a liquid crystal display device is integrated with a touch detection device, is used in the embodiments and the like described above, this is not limitative, and, for example, a touch detection device may be mounted on a liquid crystal display device instead. Even in this case, touch detection may be performed while suppressing influence of noise transmitted from the liquid crystal display device by using the above-described configuration.

The present disclosure contains subject matter related to that disclosed in Japanese Priority Patent Application JP 2010-218732 filed in the Japan Patent Office on Sep. 29, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display unit comprising:
a first substrate;
a second substrate opposed to the first substrate in a vertical direction perpendicular to the first substrate;
a liquid crystal layer disposed between the first substrate and the second substrate;
drive electrodes;
pixel electrodes disposed between the drive electrodes and the liquid crystal layer, in the vertical direction;
pixel signal lines each connected to the pixel electrodes, the pixel signal lines being disposed under the drive electrodes in the vertical direction, and the pixel signal lines, the drive electrodes, and the pixel electrodes being sequentially arranged in the vertical direction on a liquid crystal side of the first substrate;
touch detection electrodes disposed on an upper surface side of the second substrate;
a source driver configured to apply a pixel signal to the pixel signal lines;
a touch detection circuit configured to detect a touch event based on a detection signal that is output from the touch detection electrodes during a touch detection period that is distinct from a display period during which the pixel signal is supplied to the pixel electrodes;
a switch configured to switch an electrical connection between the source driver and the pixel signal lines; and a drive electrode driver configured to:
  in the display period, sequentially apply an alternating current (AC) drive signal to the drive electrodes corresponding to a series of horizontal lines as a display drive object, and the liquid crystal layer being driven by applying a first voltage between the pixel electrodes and the drive electrodes, and
  in the touch detection period, sequentially apply:
    the AC drive signal, as a touch detection drive signal, selectively to a first subset of the drive electrodes, and
    a direct current (DC) drive signal to a second subset of the drive electrodes that are mutually exclusive with the first subset of the drive electrodes,
wherein, in the touch detection period, the source driver applies a second voltage to the pixel signal lines at a predetermined level to maintain a respective potential of each of the pixel signal lines, and
wherein the touch event is detected based on the detection signal, such that the touch detection drive signal is transmitted to the touch detection electrodes through a first capacitance between the touch detection electrodes and the first subset of the drive electrodes, allowing the detection signal to change and to be output from the detection electrodes.

2. The display unit according to claim 1, wherein the touch detection circuit has a detection switch allowing the detection signal to be transmitted, the detection switch being turned on immediately before the touch detection period, thereby applying a virtual short-circuit voltage to the touch detection electrodes.

3. The display unit according to claim 1, wherein
  the touch detection electrodes form a second capacitance with the pixel signal lines, and
  the touch detection electrodes overlap the pixel signal lines in a perspective from the vertical direction.

4. The display unit according to claim 1, wherein, in the touch detection period, the source driver applies the second voltage to the pixel signal lines at the predetermined level to maintain the respective potential of each of the pixel signal line, thereby reducing a second capacitance corresponding to a direct coupling between the touch detection electrodes and the pixel signal lines.

* * * * *